US010369508B2

(12) United States Patent
Dexter et al.

(10) Patent No.: US 10,369,508 B2
(45) Date of Patent: Aug. 6, 2019

(54) FILTER WITH SHIELD FEATURES

(71) Applicants: Levi William Dexter, Elm Creek, NE (US); Benny Mathew Varghese, Kearney, NE (US)

(72) Inventors: Levi William Dexter, Elm Creek, NE (US); Benny Mathew Varghese, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 153 days.

(21) Appl. No.: 15/440,161

(22) Filed: Feb. 23, 2017

(65) Prior Publication Data

US 2018/0236391 A1    Aug. 23, 2018

(51) Int. Cl.
| | |
|---|---|
| *B01D 46/10* | (2006.01) |
| *B01D 29/52* | (2006.01) |
| *B01D 46/42* | (2006.01) |
| *B01D 46/52* | (2006.01) |
| *B01D 46/00* | (2006.01) |

(52) U.S. Cl.
CPC ..... *B01D 46/4227* (2013.01); *B01D 46/0005* (2013.01); *B01D 46/521* (2013.01)

(58) Field of Classification Search
CPC .. B01D 46/0001; B01D 46/002; B01D 46/10; B01D 46/125; B01D 46/2411; B01D 46/522; B01D 46/0041; B01D 46/521; B01D 2201/12; B01D 2201/325; B01D 29/52; B01D 29/232; B01D 29/111; Y10S 55/05

USPC ............... 55/484, 521, 491, 498, 502, 357; 493/405

See application file for complete search history.

(56) References Cited

U.S. PATENT DOCUMENTS

| | | | |
|---|---|---|---|
| 2,626,010 | A | 1/1953 | Sebok |
| 4,207,085 | A | 6/1980 | Clifton |
| 4,440,555 | A | 4/1984 | Chichester |
| 4,882,055 | A | 11/1989 | Stamstad |
| 5,474,337 | A | 12/1995 | Nepsund et al. |
| 5,512,074 | A | 4/1996 | Hanni et al. |
| 5,569,311 | A | 10/1996 | Oda et al. |

(Continued)

FOREIGN PATENT DOCUMENTS

| | | |
|---|---|---|
| CN | 201193576 Y | 2/2009 |
| CN | 101424233 A | 5/2009 |

(Continued)

*Primary Examiner* — Amber R Orlando
*Assistant Examiner* — Minh Chau T Pham
(74) *Attorney, Agent, or Firm* — Reinhart Boerner Van Deuren P.C.

(57) ABSTRACT

Filters and filter assemblies including one or more shield elements to protect the filter media of the filters during installation of the filters into a filter housing of the filter assembly are provided. A filter includes first and second media packs, a housing seal system, a handle and a shield element. Filter media packs extend from a first end to a second end in a diverging manner. The first end has a length dimension and a width dimension that extend transversely. A shield element projects over the first and second media packs at the first end a span in the width direction of at least 40% of the width dimension defined by the first and second media packs and projecting a span in the length direction of at least 5% of the length dimension defined by the first end.

19 Claims, 27 Drawing Sheets

(56) References Cited

U.S. PATENT DOCUMENTS

| | | |
|---|---|---|
| 6,375,700 B1 | 4/2002 | Jaroszczyk et al. |
| 6,447,566 B1 | 9/2002 | Rivera et al. |
| 6,482,247 B2 | 11/2002 | Jaroszczyk et al. |
| 6,485,538 B1 | 11/2002 | Toyoshima |
| 6,511,599 B2 | 1/2003 | Jaroszczyk et al. |
| 6,846,342 B2 | 1/2005 | Mertz et al. |
| 6,955,696 B1 | 10/2005 | Ost et al. |
| 7,314,558 B1 | 1/2008 | Jaroszczyk et al. |
| 7,323,105 B1 | 1/2008 | Jaroszczyk et al. |
| 7,323,106 B2 | 1/2008 | Jaroszczyk et al. |
| 7,540,895 B2 | 6/2009 | Furseth et al. |
| 7,588,629 B2 | 9/2009 | Osborne et al. |
| 7,597,735 B2 | 10/2009 | Terres et al. |
| 7,648,546 B2 | 1/2010 | Haberkamp et al. |
| 7,662,216 B1 | 2/2010 | Terres et al. |
| 7,691,165 B1 | 4/2010 | Hammes |
| 7,740,678 B2 | 6/2010 | Gunderson et al. |
| 7,799,108 B2 | 9/2010 | Connor et al. |
| 7,879,125 B2 | 2/2011 | Haberkamp et al. |
| 7,947,101 B2 | 5/2011 | Devine et al. |
| 8,404,115 B2 | 3/2013 | Myers et al. |
| 8,425,644 B2 * | 4/2013 | Sundvik ............... B01D 46/125 55/484 |
| 8,535,403 B2 | 9/2013 | Patwardhan et al. |
| 8,668,756 B2 | 3/2014 | Zon et al. |
| 8,764,870 B2 | 7/2014 | Antony et al. |
| 8,926,725 B2 * | 1/2015 | Loken ............... B01D 46/125 55/484 |
| 9,387,424 B2 | 7/2016 | Antony et al. |
| 2004/0074387 A1 * | 4/2004 | Jaisinghani ............... B03C 3/09 95/63 |
| 2006/0065592 A1 | 3/2006 | Terres et al. |
| 2007/0204579 A1 | 9/2007 | Karlsson et al. |
| 2008/0011672 A1 | 1/2008 | Schwartz et al. |
| 2008/0011673 A1 | 1/2008 | Janikowski et al. |
| 2008/0040883 A1 | 2/2008 | Beskow et al. |
| 2009/0193773 A1 | 8/2009 | Sundvik et al. |
| 2010/0126128 A1 | 5/2010 | Scott, III |
| 2010/0269468 A1 | 10/2010 | Crabtree et al. |
| 2011/0233133 A1 | 9/2011 | Wacker et al. |
| 2011/0277430 A1 | 11/2011 | Nicholas |
| 2012/0055127 A1 * | 3/2012 | Holzmann ......... B01D 46/0001 55/484 |
| 2012/0067013 A1 | 3/2012 | Antony et al. |
| 2013/0062276 A1 | 3/2013 | Barreteau et al. |
| 2013/0167493 A1 | 7/2013 | Gorman |
| 2014/0034565 A1 | 2/2014 | Loken et al. |
| 2014/0096493 A1 | 4/2014 | Kelmartin et al. |
| 2014/0290194 A1 | 10/2014 | Muenkel et al. |
| 2014/0305087 A1 | 10/2014 | Antony et al. |
| 2015/0013293 A1 | 1/2015 | Wagner et al. |
| 2015/0246308 A1 | 9/2015 | Lans |
| 2016/0016100 A1 * | 1/2016 | Mouanda ............... B01D 46/10 55/521 |
| 2017/0014743 A1 | 1/2017 | Varghese et al. |
| 2018/0257017 A1 * | 9/2018 | Adamek ............... B01D 46/0005 |

FOREIGN PATENT DOCUMENTS

| | | |
|---|---|---|
| WO | WO 2007/084709 A1 | 7/2007 |
| WO | WO 2014/040615 A1 | 3/2014 |
| WO | WO 2014/058692 A1 | 4/2014 |
| WO | WO 2017/192441 A1 | 11/2017 |

* cited by examiner

FILTER WITH SHIELD FEATURES

FIELD OF THE INVENTION

This invention generally relates to filters and more particularly to air filters and more particularly to air filters having panels of filter media.

BACKGROUND OF THE INVENTION

Filter elements are used to filter fluid such as air to prevent damage or reduced functionality of downstream systems. Typically, the filter elements are configured to be a replacement part such that when they become clogged or their useful life is otherwise spent, they can be replaced.

One particular type of filter element utilizes a plurality of panels of filter media operably mounted to a frame. The panels of filter media are operably sealed relative to each other on three sides to form a cavity that is open on a single side.

It has been determined that when pleated filter media is used to form the panels and the pleats extend generally perpendicular to the insertion direction of the filter elements into a corresponding housing, the pleats can be damaged due to improper user installation. More particularly, if the user pushes on the pleated media rather than the frame, the panels may tear causing an undesirable leak path. Further, some embodiments of filter housing include covers that include projections that extend toward the filter element. Unfortunately, if these projections are pushed into the pleated media, the pleated media can likewise be damaged.

The present invention relates to improvements over the state of the art for this type of filter element.

BRIEF SUMMARY OF THE INVENTION

In one embodiment, a filter element includes first and second media panels, a support frame, a base frame and first and second end cap structures is provided. Each filter media panel defines a first, a second, a third, and a fourth side. For each filter media panel, the first and second sides are offset from one another and extend between the third and fourth sides which are offset from one another. The support frame maintains the first and second filter media panels in a generally spaced orientation forming a cavity therebetween. The base frame defines a first opening in fluid communication with the cavity. The first end cap structure operably seals the third side of the first and second filter media panels and the second end cap structure operably seals the fourth side of the first and second filter media panels. The base frame has a first portion captured in the first end cap structure and a second portion captured in the second end cap structure.

In one embodiment, the first portion of the base frame is a first outward extending flange that is received in the first end cap structure and the second portion of the base frame is a second outward extending flange that is received in the second end cap structure. The first and second flanges are on opposite sides of the first opening and extend outward away from one another.

In one embodiment, the support frame defines first, second, third, and fourth sides with, the first and second sides offset from one another and extending between the third and fourth sides. The first side of the support frame is positioned adjacent the first sides of the first and second filter media panels. The second side of the support frame is positioned adjacent the second sides of the first and second filter media panels. The third side of the support frame is positioned adjacent the third sides of the first and second filter media panels. The fourth side of the support frame is positioned adjacent the fourth sides of the first and second filter media panels.

In one embodiment, the third side of the support frame is captured in the first end cap structure and the fourth side of the support frame is captured in the second end cap structure.

In one embodiment, the filter element includes a second side support structure adjacent the second sides of the first and second media panels and the support frame. The second side support structure extends between first and second ends. The first end is captured in the first end cap structure and the second end is captured in the second end cap structure.

In one embodiment, the first and second filter media panels are pleated media panels. At least one pleat of the first and second filter media panels is pinched between the second side of the support frame and the second side support structure.

In one embodiment, a seal material is interposed between the second side of the support frame and the second side support structure. The seal material seals the second side of the first and second filter media panels to at least one of the second side of the support frame and the second side support structure.

In one embodiment, the second side support structure includes a handle member.

In one embodiment, the second side of the support frame overlaps, at least in part, the second sides of the first and second filter media panels.

In one embodiment, a housing seal is carried by the base frame for operably sealing the filter element to a housing structure.

In one embodiment, the first and second end cap structures are each composite structures including a cupped end cap and adhesive within the cupped end cap. At least the adhesive captures the corresponding side of the support frame, portion of the base frame and sealing the corresponding sides of the first and second filter media panel.

In one embodiment, the first and second end cap structures are formed from rigid urethane. The rigid urethane captures the corresponding side of the support frame, portion of the base frame and sealing the corresponding sides of the first and second filter media panel.

In one embodiment, the first sides of the first and second filter media panels are sealingly attached to the base frame.

In one embodiment, the first side of the support frame defines a second opening in fluid communication with the cavity between the first and second filter media panels.

In one embodiment, the first, second, third, and fourth sides of the support frame bound first and second flow openings. The first flow opening being adjacent the first filter media panel and the second flow opening being adjacent the second filter media panel.

In one embodiment, the first and second filter media panels define interior faces. The interior faces of the first and second filter media panels generally facing each other.

In one embodiment, the support frame and base frame maintain the interior faces of the first and second filter media panels in a non-parallel orientation with the first sides of the first and second panels spaced apart from one another at a greater distance than the second sides of the first and second panels such that the cavity is generally wedge shaped.

In one embodiment, each of the first and second portions of the base frame defines first and second tapered locating surfaces. The first side of the first filter media panel is supported on the first tapered locating surfaces and the first side of the second filter media panel supported on the second tapered locating surfaces.

In one embodiment, the first tapered locating surfaces are substantially parallel to the first side of the first filter media panel and the second tapered locating surfaces are substantially parallel to the first side of the second filter media panel.

In one embodiment, the first tapered locating surfaces are substantially perpendicular to the interior face of the first filter media panel and the second tapered locating surfaces are substantially perpendicular to the interior face of the second filter media panel.

In one embodiment, the first and second filter media panels are pleated media panels formed from a sheet of filter media having a plurality of panels formed by alternating folds, the folds extending longitudinally between the third and fourth sides of the filter media panels, the first side of the filter media panels being adjacent the base frame and the second side of the filter media panel being spaced apart from the first side and the base frame, the third and fourth sides of the filter media panels extending between the first and second sides.

In another embodiment, a filter element including first and second filter media panels, a support frame and a base frame is provided. Each filter media panel defines first, second, third and fourth sides. The first and second sides are offset from one another and extend between the third and fourth sides. The first and second filter media panels define interior faces. The interior faces of the first and second filter media panels generally facing each other. The support frame maintains the first and second filter media panels in a generally spaced orientation forming a cavity therebetween. The base frame defines a first opening in fluid communication with the cavity. The support frame and base frame maintaining the interior faces of the first and second filter media panels in a non-parallel orientation with the first sides of the first and second panels spaced apart from one another at a greater distance than the second sides of the first and second panels such that the cavity is generally wedge shaped. The base frame defines first and second tapered locating surfaces. The first side of the first filter media panel supported on the first tapered locating surfaces and the first side of the second filter media panel supported on the second tapered locating surfaces.

In one embodiment, the first and second tapered locating surfaces are non-perpendicular and non-parallel to one another.

In one embodiment, the first and second tapered locating surfaces are non-perpendicular and non-parallel to a bisecting plane extending between the first and second filter media panels. The first and second tapered locating surfaces extend at a first angle relative to the bisecting plane. The interior faces of the first and second filter media panels extending at a second angle relative to the bisecting plane, the first and second angles being substantially complimentary.

In one embodiment, the first tapered locating surfaces are substantially parallel to the first side of the first filter media panel and the second tapered locating surfaces are substantially parallel to the first side of the second filter media panel.

In one embodiment, the first tapered locating surfaces are substantially perpendicular to the interior face of the first filter media panel and the second tapered locating surfaces are substantially perpendicular to the interior face of the second filter media panel.

In another embodiment, a filter element including first and second filter media panels, a support frame and a base frame is provided. Each filter media panel defines first, second, third and fourth sides. The first and second sides are offset from one another and extend between the third and fourth sides. The first and second filter media panels define interior faces. The interior faces of the first and second filter media panels generally facing each other. The support frame maintains the first and second filter media panels in a generally spaced orientation forming a cavity therebetween. The base frame defines a first opening in fluid communication with the cavity. The support frame maintains the interior faces of the first and second filter media panels in a non-parallel orientation with the first sides of the first and second panels being spaced apart from one another at a greater distance than the second sides of the first and second panels such that the cavity is generally wedge shaped. The support frame being attached to the base frame.

In one embodiment, the support frame is snap attached to the base frame.

In one embodiment, a handle member is attached to the support frame proximate the second sides of the filter media panels.

In one embodiment, the support frame has receptacles and the handle member has projections that extend into the receptacles.

In one embodiment, the base frame has a first portion captured in a first end cap structure and a second portion captured in a second end cap structure.

In one embodiment, the first end cap structure operably seals the third side of the first and second filter media panels and the second end cap structure operably seals the fourth side of the first and second filter media panels. The support frame has first, second, third and fourth sides with, the third and fourth sides being spaced apart and extending between the first and second sides. The third side of the support frame is captured by the first end cap structure and the fourth side of the support frame is captured by the second end cap structure.

In one embodiment, a first end of the handle member is captured by the first end cap structure and a second opposed end of the handle member is captured by the second end cap structure.

In one embodiment, the handle member includes a gripping portion configured to be gripped by a user. The gripping portion is positioned between and offset from the first and second ends of the handle member.

In one embodiment, the end cap structures are generally cup shaped and define an end cap cavity holding an adhesive therein. The end cap structures capture the components within the adhesive within the end cap cavity.

In another embodiment, a frame for holding first and second filter media panels including a base frame and a support frame is provided. The base frame defines a first opening therethrough. The support frame is attached to the base frame and extends outward therefrom. The base frame and support frame are configured to maintain the first and second filter media panels in a generally spaced orientation forming a cavity therebetween when mounted to the support frame and base frame. The support frame and base frame maintain interior faces of the first and second filter media panels in a non-parallel orientation with the first sides of the first and second panels spaced part from one another at a greater distance than the second sides of the first and second panels such that the cavity is generally wedge shaped.

In one embodiment, the support frame has first, second, third and fourth sides. The first side defines a second opening in fluid communication with the first opening in the base frame. The third and fourth sides have converging edges that converge proximate the second side.

In one embodiment, the third side is formed by a pair of third side elongated segments that converge at the second side and a third side cross brace that extends between the pair of third side elongated segments. The third side cross brace is closer to the first side than the second side. A pair of fourth side elongated segments converge at the second side and a fourth side cross brace extends between the pair of first side elongated segments. The fourth side cross brace is closer to the first side than the second side.

In one embodiment, the first side of the support frame is provided by a pair of first side elongated segments that extend generally parallel to one another between the third and fourth sides.

In one embodiment, the third and fourth side cross braces are located at the first side.

In one embodiment, the third and fourth side cross braces include connection members for connecting the support frame to the main frame.

In another embodiment a filter element including first and second filter media panels, a support frame, a base frame and first and second support screens is provided. Each filter media panel defines first, second, third and fourth sides. The first and second sides are offset from one another and extend between the third and fourth sides. The first and second filter media panels define interior faces. The interior faces of the first and second filter media panels generally face each other. The support frame maintains the first and second filter media panels in a generally spaced orientation forming a cavity therebetween. The support frame is located between first and second filter media panels. The base frame defines a first opening in fluid communication with the cavity and is located proximate the first sides of the first and second filter media panels. Each screen is substantially L-shaped having a first side portion and an interior face portion. The first side portion of the first support screen is adjacent the first side of the first filter media panel and the interior face portion of the first support screen is adjacent the interior face of the first filter media. The first side portion of the second support screen is adjacent the first side of the second filter media panel and the interior face portion of the second support screen is adjacent the interior face of the second filter media.

In one embodiment, the interior face portion of the first support screen is positioned between the support frame and the interior face of the first filter media panel and the first side portion of the first support screen is positioned between the base frame and the first side of the first filter media panel. The interior face portion of the second support screen is positioned between the support frame and the interior face of the second filter media panel and the first side portion of the second support screen is positioned between the base frame and the first side of the second filter media panel.

In one embodiment, each of the first and second support screens is formed from separate first and second pieces of screen with the first side portion being formed from the first piece of screen and the interior face portion being formed from the second piece of screen.

In one embodiment, the first and second support screens are formed from a single piece.

Further embodiments of filters and filter assemblies include features outlined above. One embodiment of a filter includes first and second media packs, a housing seal system, a handle and a shield element. The first and second filter media packs extend from a first end to a second end. The first end has a length dimension and a width dimension that extend transversely. The width dimension is defined by the first and second media packs. The first and second filter media packs converge at the first end and diverge when moving away from the first end toward the second end to define an air flow cavity therebetween. The housing seal system is located at the second end. A handle is located at the first end. A shield element projects over the first and second media packs at the first end a span in the width direction of at least 40% of the width dimension defined by the first and second media packs and projecting a span in the length direction of at least 5% of the length dimension defined by the first end.

In one embodiment, the shield element comprises wing panels covering the first and second filter media packs underneath the handle and in a central region along the length of the first end.

In one embodiment, the shield element comprises wing panels covering the first and second filter media packs proximate at least one edge region along the length of the first end. The wing panels extend over the first and second media packs at the first end in the length direction at least 0.5 inches.

In one embodiment, the wing panels extend over the first and second media packs at the first end in the length direction at least 0.75 inches.

In one embodiment, the span the shield element projects over the first and second media packs in the width direction is at least 75% of the width dimension of the first end.

In one embodiment, the wing panels extend over the media pack at the first end at least 90% of the width dimension in the width direction.

In one embodiment, the shield element is a preformed component secured to the first and second media packs.

In one embodiment, the first and second filter media packs are pleated having pleat folds. The filter further includes first and second end caps and a handle frame. The first and second end caps are on opposite first and second sides of the first and second filter media packs. The pleat folds run laterally between the first and second opposite sides and the end caps. The handle frame is located at the first end and includes the handle extending from a bridge element. The bridge element spans intermediate of the first and second filter media packs and between the first and second end caps. The handle frame includes the shield element which projects laterally from the bridge element.

In one embodiment, the shield element is located proximate a first end of the bridge element and extends partially into the first end cap defining an unexposed portion and extends partially out of the first end cap defining an exposed portion that is exposed exteriorly of the first end cap.

In an embodiment, the exposed portion extends at least 0.5 inches in the length direction and the unexposed portion extends less than 0.5 inches in the length direction.

In another embodiment, a filter including first and second filter media packs, a housing seal system, first and second end caps and a handle frame is provided. The first and second filter media packs extend from a first end to a second end. The first end has a length dimension and a width dimension that extend transversely. The first and second filter media packs converge at the first end and diverge when moving away from the first end toward the second end to define an air flow cavity therebetween. The first and second filter media packs are pleated having pleat folds. The housing seal system is at the second end. The first and second end caps are on opposite first and second sides of the first and second filter media packs. The pleat folds run laterally between the first and second opposite sides. The handle frame is at the first end and includes a bridge element spanning intermediate of the first and second filter media packs and between the first and second end caps. The handle frame includes a first shield element that includes at least one wing panel projecting laterally from the bridge element.

In one embodiment, the first shield element is located proximate a first end of the bridge element and extends partially into the first end cap and partially out of the first end cap defining an exposed portion that is exposed exteriorly of the first end cap.

In one embodiment, the exposed portion of the first shield element covers the first and second filter media packs in the width direction at least 75% of the width dimension and in the length direction at least 5% of the length.

In one embodiment, the filter includes a second shield element located proximate a second end of the bridge element and which extends partially into the second end cap and partially out of the second end cap defining an exposed portion that is exposed exteriorly of the second end cap.

In one embodiment, the filter further includes a third shield element located centrally along the length. The third shield element is spaced from both the first and second shield elements along the length.

In another embodiment, a housing and filter assembly is provided and includes an air cleaner housing assembly and a filter. The air cleaner housing assembly includes a housing base defining a filter cavity and a housing lid removably covering the housing base to define a filter cavity. The air cleaner assembly includes a clean air outlet and an unfiltered air inlet. The housing lid comprises a tubular element projecting toward the housing base and into the cavity. The filter is disposed in the filter cavity and arranged to filter air between the clean air outlet and the unfiltered air inlet. The filter includes a filter media arrangement having a first end and a second end. The filter includes a housing seal system at the second end. The filter includes a frame member at the first end and comprises a first shield element. The first shield element defines a perimeter larger than the tubular element to prevent the tubular element from contacting the filter media arrangement.

In one embodiment, the frame member includes an outward extending handle member spaced away from the first shield element. The handle member is received within the tubular member when the housing lid is attached to the housing base.

In an embodiment, a filter including first and second filter media panels is provided. Each filter media panel defines a first, a second, a third and a fourth side. The first and second sides are offset from one another and extend between the third and fourth sides which are offset from one another. A support frame maintains the first and second filter media panels in a generally spaced orientation forming a cavity therebetween. A base frame defines a first opening in fluid communication with the cavity. A seal gasket is attached to the base frame. The base frame includes a plurality of openings through which the seal gasket extends. The seal gasket closes the openings. A first end cap structure operably seals the third side of the first and second filter media panels. A second end cap structure operably seals the fourth side of the first and second filter media panels. The base frame has a first portion captured in the first end cap structure and a second portion captured in the second end cap structure.

In one embodiment, the seal gasket is molded directly to the base frame and through the openings.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is not intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
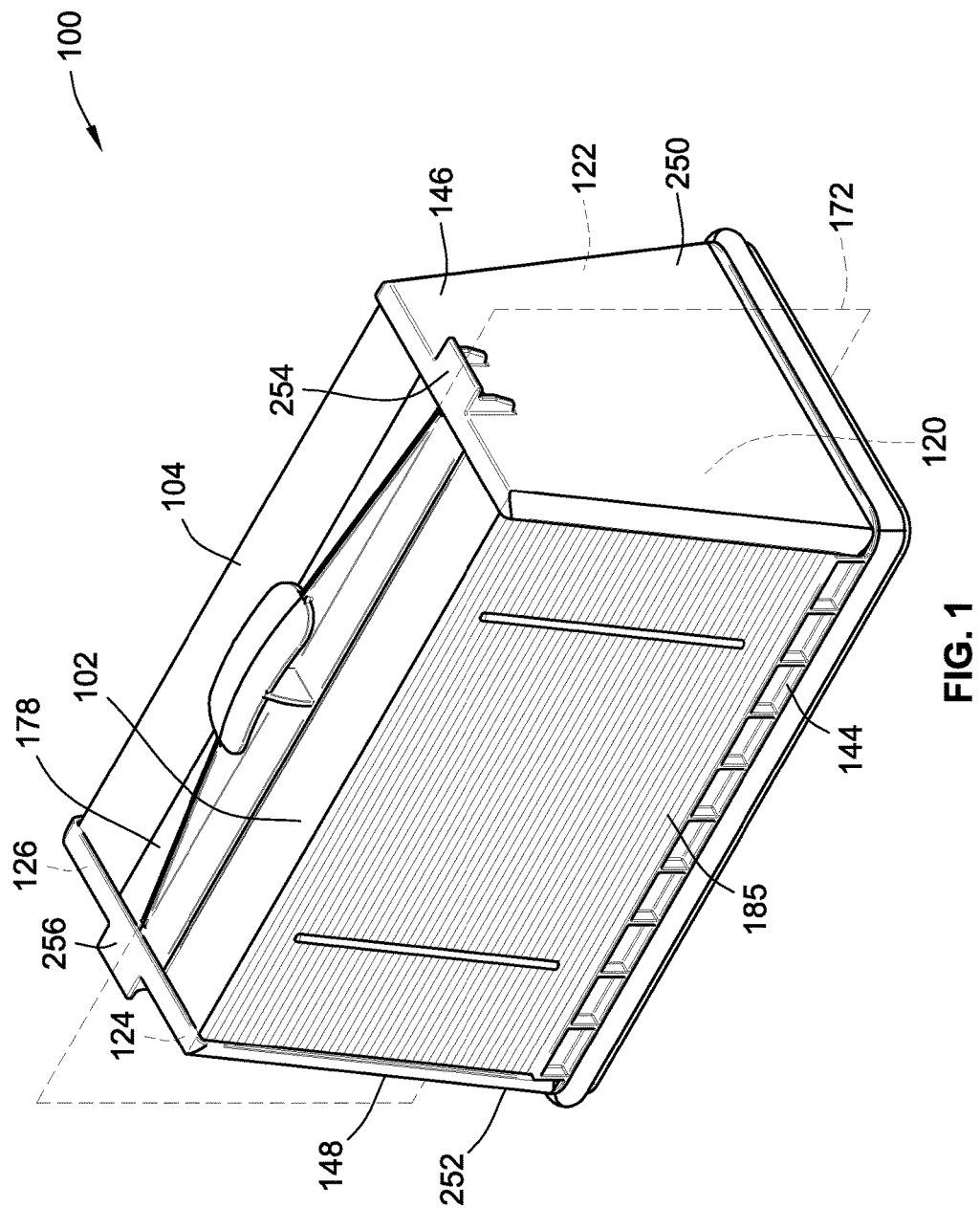
FIG. 1 is a perspective illustration of a first embodiment of a filter element according to the invention.

FIG. 1 is a perspective illustration of an embodiment of a filter element 100 for filtering air. The filter element 100 will filter fluid such as air as it is passed therethrough to remove particulates and impurities carried by the fluid being filtered.

The filter element 100 includes a pair of filter media panels 102, 104 through which the fluid passes that performs the filtering. The filter media panels 102, 104 may be formed from various different types of filter media and in one embodiment the filter media panels 102, 104 are provided by pleated filter media. The pleated filter media is formed by a plurality of adjacent panels connected to one another at a plurality of alternating folds in an accordion fashion.

Figure 2:
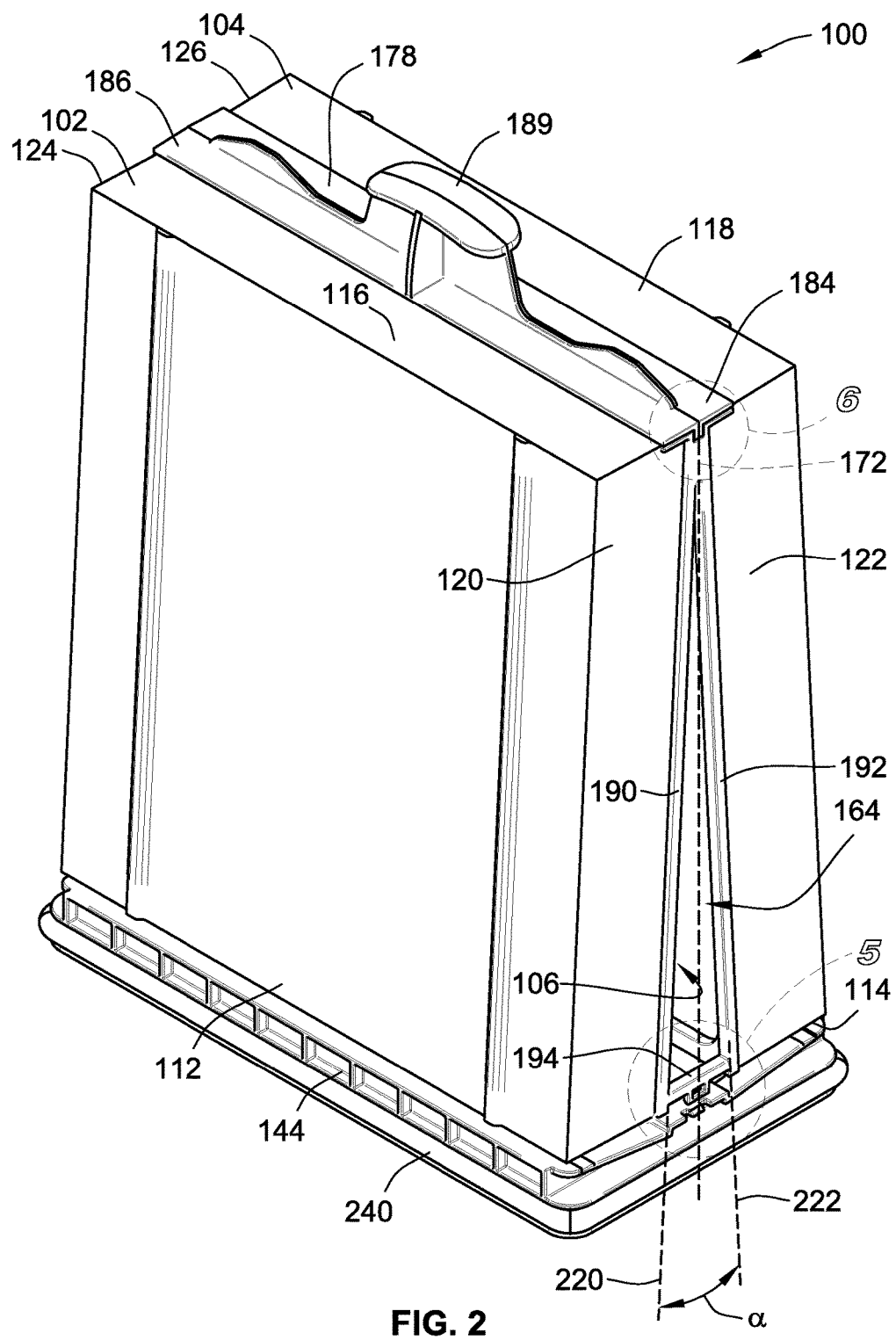
FIG. 2 is a partial perspective illustration of the filter element of FIG. 1.

With reference to FIG. 2, the filter media panels 102, 104 are mounted to a multi-component holding assembly and oriented such that the filter media panels extend at an angle α relative to one another. Due at least to the angle α between the filter media panels 102, 104, the filter media panels 102, 104 form a cavity 106 therebetween.

Figure 3:
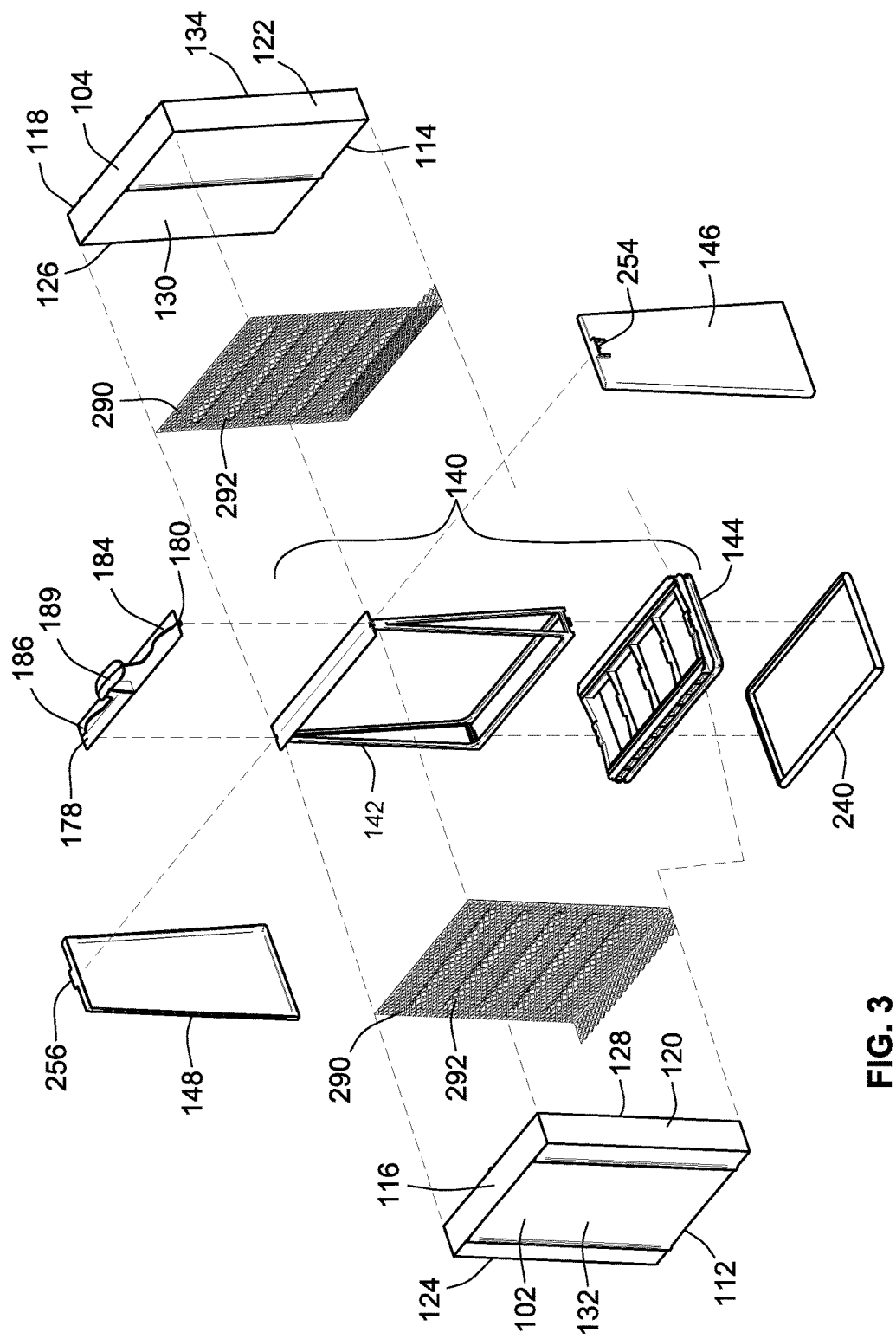
FIG. 3 is an exploded illustration of the filter element of FIG. 1.

With reference to FIG. 3, the filter media panels 102, 104 each have a generally rectangular periphery including a first side 112, 114, a second side 116, 118, a third side 120, 122 and a fourth side 124, 126. The filter media panels 102, 104 also include inner faces 128, 130 that face one another when assembled and outer faces 132, 134 that face away from one another when assembled. The faces are bounded by the first 112, 114, second 116, 118, third 120, 122 and fourth 124, 126 sides. The inner and outer faces 128, 130, 132, 134 may be considered flow faces as the primary fluid flow through the filter media panels 102, 104 is through these faces 128, 130, 132, 134.

The multi-component holding assembly 140 is configured to mount the filter media panels 102, 104 in the desired orientation. The multi-component holding assembly 140 of the illustrated embodiment generally includes a support frame 142, a base frame 144, first and second end cap structures 146, 148 and a second side support structure 178.

The support frame 142 generally maintains the first and second filter media panels in the desired spaced orientation such that cavity 106 (FIG. 2) is formed. In the illustrated embodiment, the spaced orientation is angled at angle α as indicated previously. In this configuration, the interior faces 128, 130 are maintained in a non-parallel, non-perpendicular orientation with the first sides 112, 114 of the first and second filter media panels 102, 104 spaced apart from one another a greater distance than the second sides 116, 118. This orientation gives cavity 106 a wedge shape.

Figure 4:
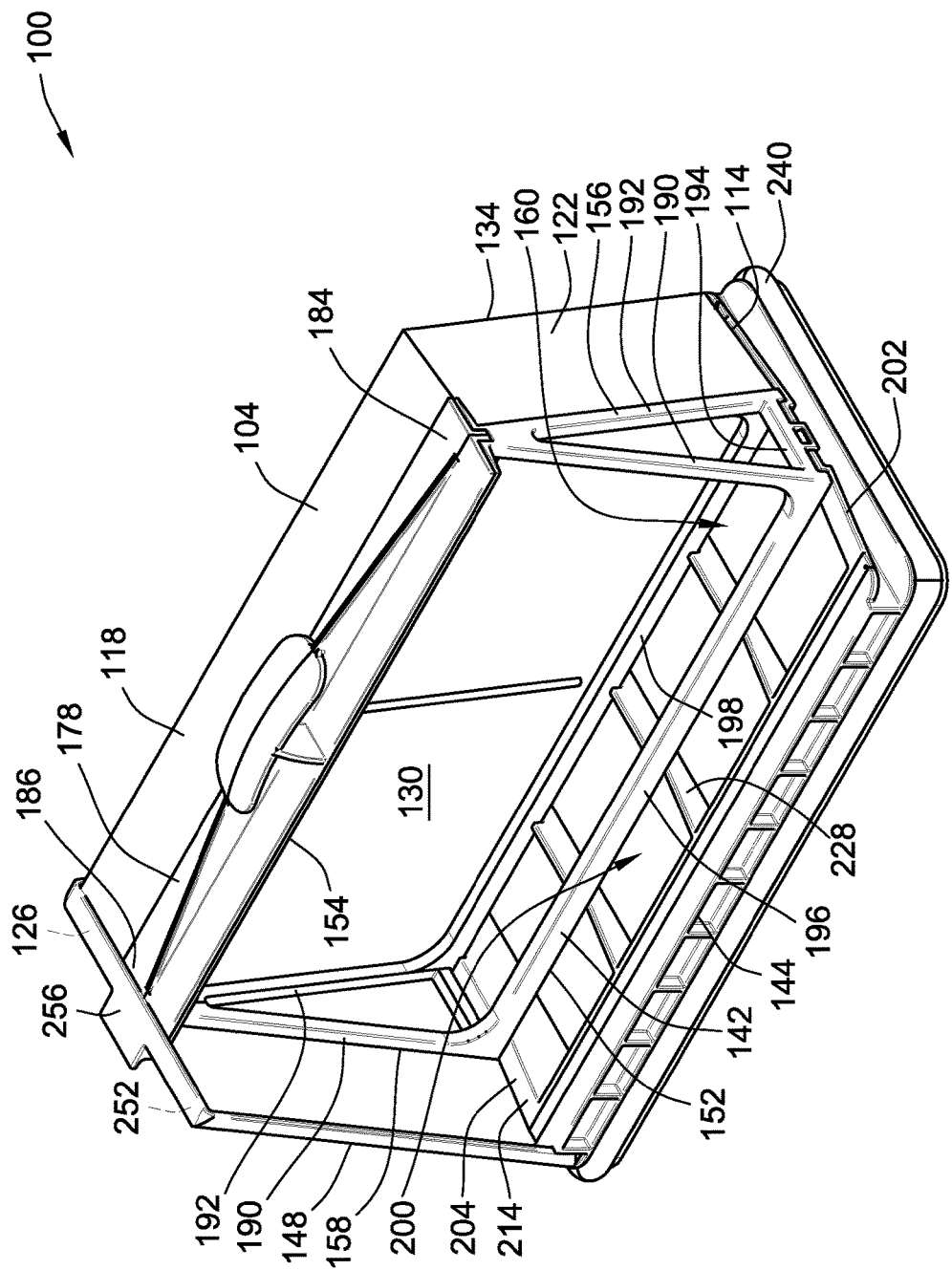
FIG. 4 partial perspective illustration of the filter element of FIG. 1.
Figure 6:
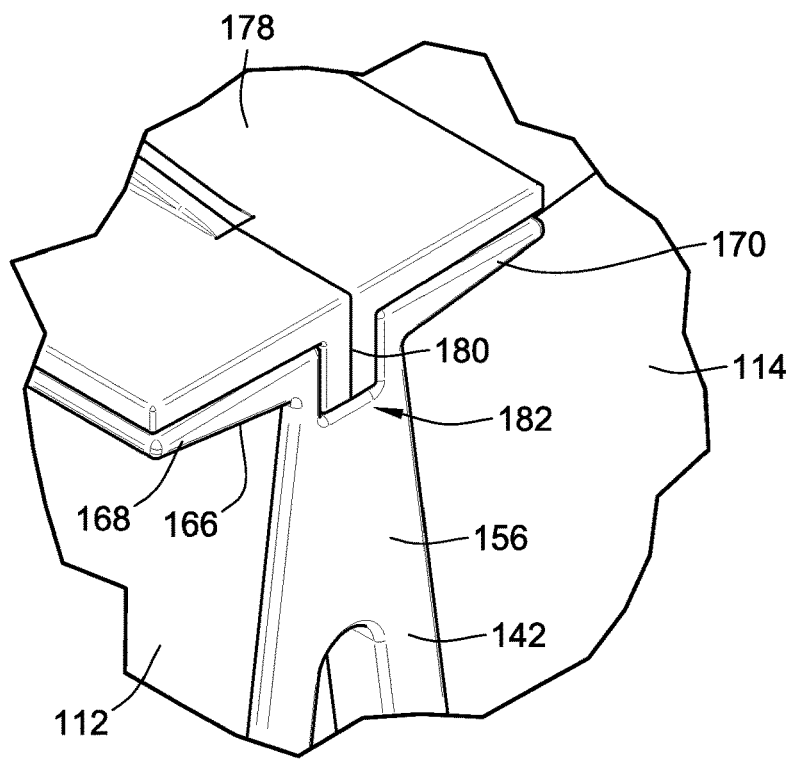
FIG. 6 is an enlarged partial illustration of the filter element of FIG. 1.
Figure 13:
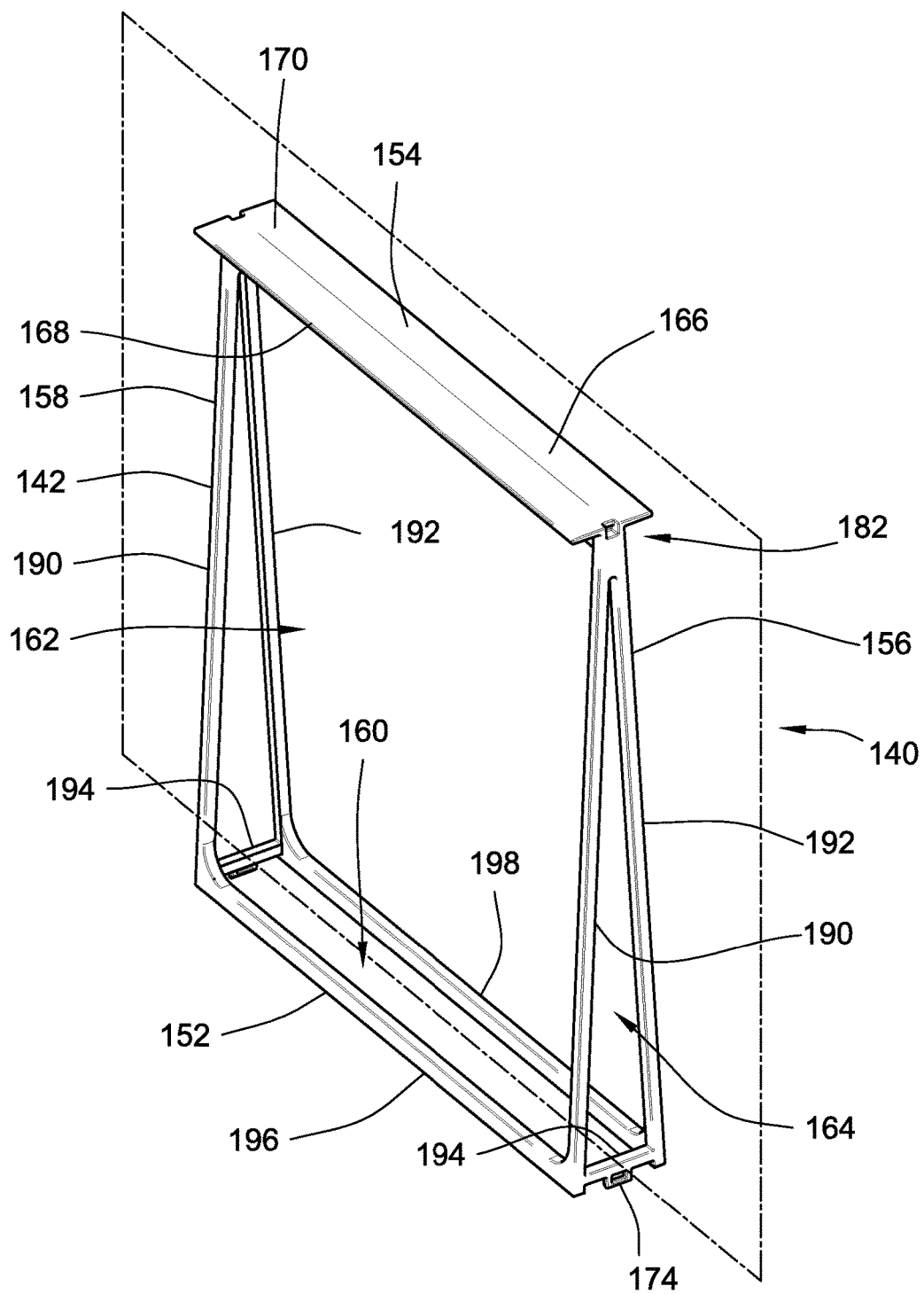
FIG. 13 illustrates the support frame of the filter element of FIG. 1.

With additional reference to FIG. 13, the support frame 142 generally defines first, second, third and fourth sides 152, 154, 156, 158. The first and second sides 152, 154 are generally offset from one another and extend between the third and fourth sides 156, 158. With additional reference to FIG. 4 (which has filter media panel 102 and end cap structure 146 removed for clarity, in the assembled state, the first side 152 of the support frame 142 is adjacent the first sides 112, 114 of the filter media panels 102, 104, the second side 154 of the support frame 142 is adjacent the second sides 116, 118 of the filter media panels 102, 104, the third side 156 of the support frame 142 is adjacent the third sides 120, 122 of the filter media panels 102, 104 and the fourth side 158 of the support frame 142 is adjacent the fourth sides 124, 126 of the filter media panels 102, 104.

In this embodiment, the first side 152 of the support frame 142 defines a first side opening 160 through which fluid flows during the filtering process to exit cavity 160 between the filter media panels 102, 104. The first, second, third and fourth sides 152, 154, 156, 158 of the support frame 142 also bound first and second flow openings 162, 164 that are adjacent to filter media panels 102, 104, respectively, when assembled, through which fluid flows prior to or after passing through corresponding filter media panels 102, 104 depending on if the filter element 100 is configured for inside-out or outside-in fluid flow.

The support frame 142, in the illustrated embodiment, includes an overlap portion 166 that has opposite first and second flange portions 168, 170 that extend laterally outward in opposite directions. The first and second flange portions 168, 170 extend laterally outward such that the overlap portion 166 overlaps at least a portion of each of the second sides 116, 118 of the first and second filter media panels 102, 104. The bottom surfaces of the flange portions 168, 170 adjacent the filter media panels 102, 104 may be angled relative to a central bisecting plane 172 of the support frame 142 at an angle equivalent to angle α/2 plus ninety degrees.

Figure 5:
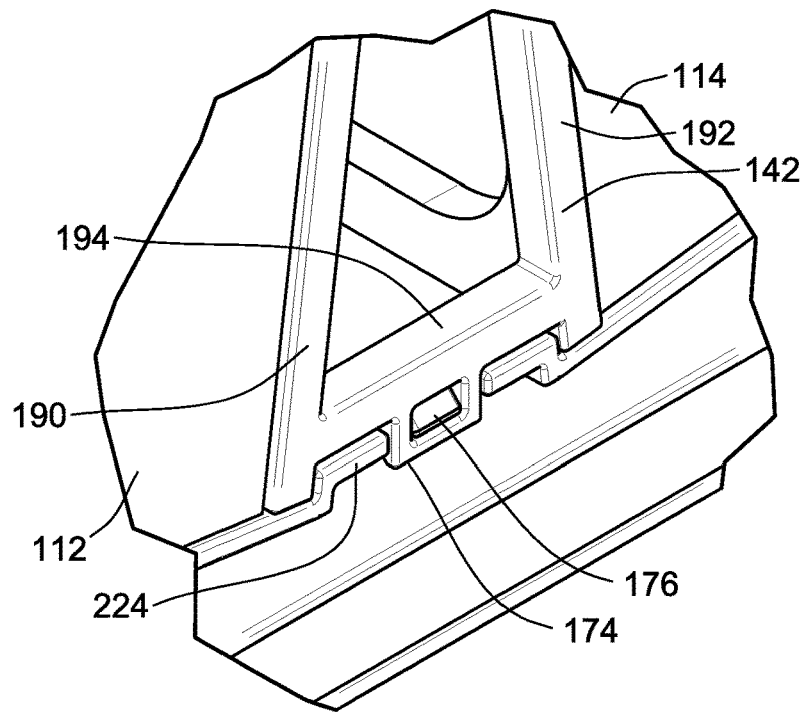
FIG. 5 is an enlarged partial illustration of the filter element of FIG. 1.

The support frame 142 is operably connected to the base frame 144. The support frame 142 in the illustrated embodiment includes snap structures 174 that snap engage corresponding snap structures 176 of the base frame 144. In the illustrated embodiment, snap structures 174 are provided by apertures formed in a portion of the support frame 142 proximate the intersection of the first side 152 with the third and fourth sides 156, 158. Snap structures 176 are outward extending projections sized and positioned to extend into the apertures provided by snap structures 174. The projections provided by the snap structures 176 may have tapers or ramps to facilitate connecting the support frame 142 to the base frame 144. Engagement of the snap structures 174 with snap structures 176 is illustrated in FIG. 5.

In alternative embodiments, the snap structures could be reversed and other cooperating snap structures are contemplated. The snap engagement facilitates initial assembly of the multi-component holding assembly 140 prior to mounting of the filter media panels 102, 104.

Figure 7:
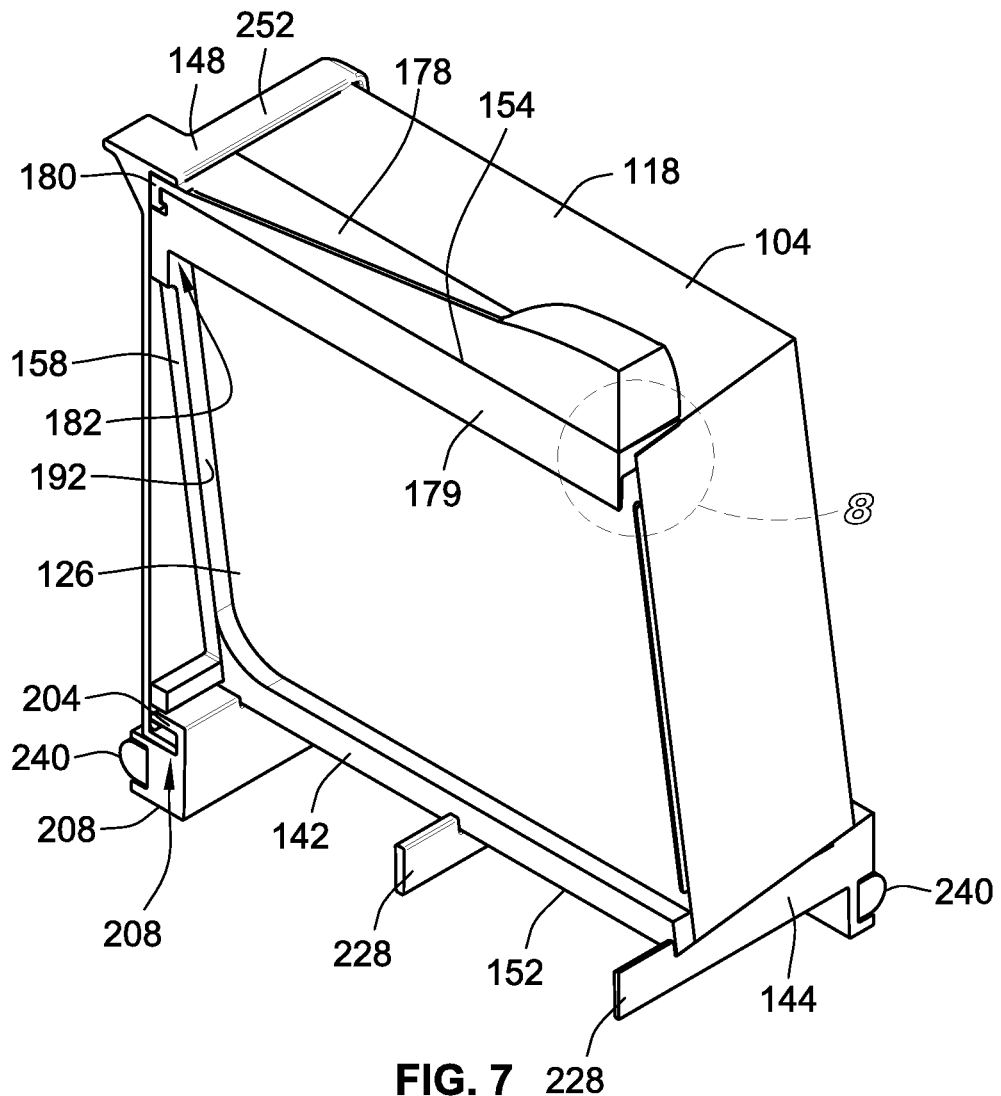
FIG. 7 is partial cross-sectional illustration of the filter element of FIG. 1.

A second side support structure 178 is operably connected to the second side 154 of the support frame 142. The second side support structure 178 includes connection elements 180 that extend into recesses 182 (also referred to as receptacles) formed in the support frame 142. Preferably, the fit between the connection elements 180 and the recesses provides a snap engagement. The second side support structure 178 extends between opposed first and second ends 184, 186 with a connection element 180 at each end. The cooperating catch arrangement of the connection elements 180 and recesses 182 may include catches or undercuts to form an improved connection between the support frame 142 and the second side support structure 178 such as illustrated in FIG. 7.

The second side support structure 178 overlaps the flange portions 168, 170 of the support frame 142. With additional reference to FIG. 8, in one embodiment where the filter media panels 102, 104 are formed from pleated media with the folds 185 (see FIG. 1) of the pleated media extending perpendicularly between the third and fourth sides 120, 122, 124, 126 of the filter media panels, at least one panel 187 of each filter media panel 102, 104 is pinched between a top surface of the corresponding flange portion 102, 104 and a bottom surface of the second side support structure 178. A seal material 188, such as a glue bead or adhesive is applied to seal the portion of the pleated media between the second side support structure 178 and the second side 154, e.g. flange portions 168, 170, to seal the filter media panels 102, 104 along the second sides 116, 118 thereof. The seal material 188 will also help secure the second side support structure to the second side 154 of the support frame 142. The support frame 142 defines a second side stop 179 that extends between the third and fourth sides 156, 158 against which the inner faces 128, 130 of the first and second filter media panels 102, 104 proximate the second sides 116, 118 thereof rest when in an assembled state.

The second side support structure 178 (also referred to as a handle member) includes a handle 189 including a gripping portion configured to be grasped by a user to remove the filter element 100 at maintenance intervals. The handle 189 is located axially between the opposed first and second ends 184, 186 of the second side support structure 178.

With reference to FIG. 13, in the illustrated embodiment, the third and fourth sides 156, 158 are formed from frame segments including a pair of converging elongated segments 190, 192 and a cross-brace segment 194 that extends between the elongated segments 190, 192. The pair of converging elongated segments 190, 192 for the third and fourth sides 156, 158 converge proximate the second side 154. The snap structures 174 are formed as part of the cross brace segments 194.

The first side 152 of the support frame is defined by the cross-brace segments 194 and a pair of first side elongated segments 196, 198 that extend generally parallel to one another between the third and fourth sides 156, 158 in a spaced apart relation.

The support frame opening is defined by the cross-brace segments 194 and the pair of first side elongated segments 196, 198.

When assembled, the inner faces 128, 130 of the first and second filter media panels may rest against the elongated segments 190, 192 and 196, 198.

The base frame 144 cooperates with the support frame 142 to support the filter media panels 102, 104. The base frame 144 supports a first side 112, 114 of the filter media panels 102, 104.

Figure 12:
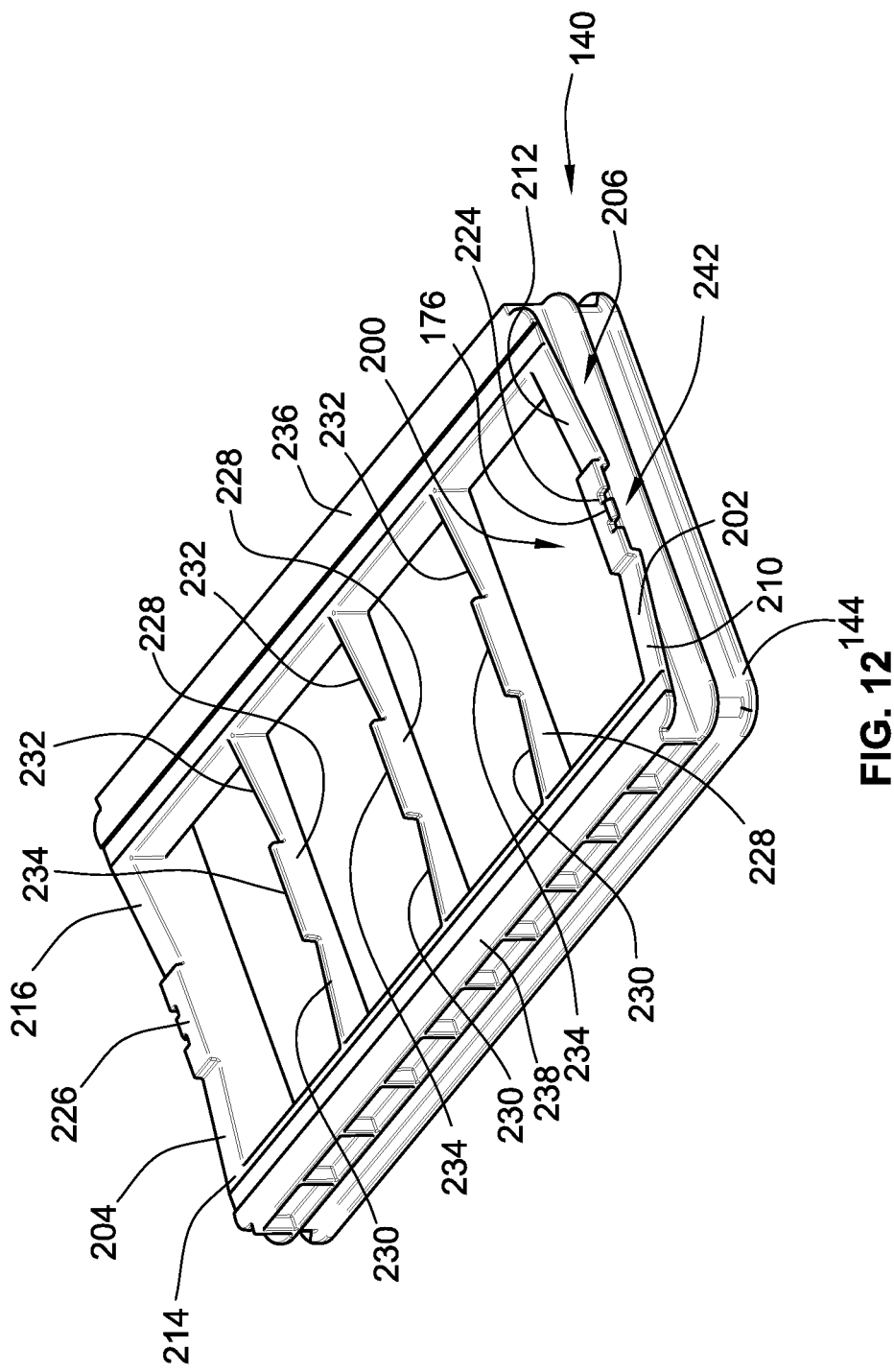
FIG. 12 illustrates the base frame of the filter element of FIG. 1.

With reference to FIG. 3 and primary reference to FIG. 12, the base frame 144 defines a base frame opening 200 through which dirty fluid enters or clean fluid exits the filter element based on the flow direction of the fluid through the filter element. More than one base frame opening may be provided if multiple sets of filter media panels are mounted to a single base frame 144.

In the illustrated embodiment, the base frame 144 includes a pair of opposed captured portions in the form of first and second outward extending flanges 202, 204. The outward extending flanges 202, 204 extend away from one another on opposite sides of the base frame opening 200 and form under cuts 206, 208.

Locating surfaces 210, 212, 214, 216 of the outward extending flanges 202, 204 support opposed ends of the first sides 112, 114 of the filter media panels 102, 104. In the illustrated embodiment, the locating surfaces 210, 212, 214, 216 are tapered relative to central plane 172 at angle of 90 minus angle α/2. As such, the locating surfaces are generally perpendicular to the planes 220, 222 (see FIG. 2) defined by the first, second, third and fourth sides 152, 154, 156, 158 of the support frame 142 against which the first and second filter media panels 102, 104 rest when assembled. Locating surfaces 210, 214 that support the first filter media panel 102 are generally parallel to flange portion 168 of the support frame 142 as well as the first side 112 of the filter media panel 102 while locating surfaces 212, 216 support the first side 114 of filter media panel 104 and are general parallel to flange portion 170 of the support frame 142 as well as the first side 114 of filter media panel 104. The tapered locating surfaces are generally perpendicular to the inner and outer faces 128, 130, 132, 134 of the filter media panels 102, 104. Locating surfaces 210, 212 of the first flange 202 extend at a non-parallel non-perpendicular angle relative to one another as well as bisecting central plane 172. Locating surfaces 214, 216 of the first flange 204 extend at a non-parallel non-perpendicular angle relative to one another as well as bisecting central plane 172.

Flanges 202, 204 each define a corresponding elevated segment 224, 226 positioned between corresponding tapered locating surfaces 210, 212 and 214, 216. The elevated segments 224, 226 define snap structures 176 that cooperate with snap structures 174 as described above. The elevated segments 224, 226 are straddled by segments 196, 198 when assembled to assist in locating the support frame 142 relative to the base frame 144.

The base frame 144 includes support members 228 that have tapered surfaces 230, 232 similar to tapered locating surfaces 210, 212, 214, 216 and that facilitate support of the first sides 112, 114 of the filter media panels 102, 104 as well as elevated projections 234 (also referred to as tabs) for locating the elongated segments 196, 198. The support members 228 extend across base frame opening 200 between parallel extending side member portions 236, 238.

The base frame 144 carries a sealing gasket 240 used to seal the filter element 100 to a filter housing (not shown). The sealing gasket 240 in the illustrated embodiment is a continuous piece of D-style rope stock. The sealing gasket 240 is carried in an annular groove 242 that circumscribes the base frame 144. In the illustrated embodiment, the sealing gasket 240 defines a radial seal. However, other embodiments could define an axial seal.

The first and second end cap structures 146, 148 assist in operably sealing the filter media panels 102, 104 to the support frame 142 and/or base frame 144 to prevent fluid from bypassing the filter media panels 102, 104.

The first end cap structure 146 operably seals the third sides 120, 122 of the filter media panels 102, 104 and the second end cap structure 148 operably seals the fourth sides 124, 126.

The first outward extending flange 202 of the base frame 144 is captured in the first end cap structure 146 while the second outward extending flange 204 of the base frame 144 is captured in the second end cap structure 148. Not only are the first and second outward extending flanges 202, 204 captured by the first and second end cap structures 146, 148, but the third side 156 of the support frame 142 is captures by the first end cap structure 146 while the fourth side 158 of the support frame 142 is captured by the second end cap structure 148.

In an embodiment, the first and second end cap structures 146, 148 are composite structures with each including a cupped end cap 250, 252 and adhesive within the cupped end cap 250, 252. The cupped end caps 250, 252 form wells for holding the adhesive. The adhesive may be a foamed urethane or known potting material. Other materials include hot melt, plastisol, epoxy, non-foamed urethane, etc. The adhesive of the first end cap structure 146 captures the third sides 120, 122 of the filter media panels 102, 104, the first outward extending flange 202, the third side 156 of the support frame 142 and the first end 184 of the second side support structure 178. The adhesive of the second end cap structure 148 captures the fourth sides 124, 126 of the filter media panels 102, 104, the second outward extending flange 204, the fourth side 158 of the support frame 142 and the second end 186 of the second side support structure 178.

The cupped end caps 250, 252 also each include outward extending mounting flanges 254, 256 for assisting in mounting the filter element 100 in a filter housing (not shown).

In addition to the adhesive of the end cap structures 146, 148, sealant beads may be applied between the first sides 112, 114 of the filter media panels 102, 104 and the base frame 144 to sealingly secure the filter media panels 102, 104 to the base frame 144. To further support the filter media panels 102, 104, adhesive may be applied to the tapered surfaces 230, 232 of the support members 228 as well as to the top surfaces of side members 236, 238. Further yet, adhesive is applied to the second sides 116, 118 of the filter media panels 102, 104 and the second side 154 of the support frame 142 as described above.

In FIG. 3, an optional support screens 290 are illustrated that will be positioned between the first and second filter media panels 102, 104 and the support frame 142 and the base frame 144 as will be described in more detail with regard to the embodiment of FIG. 9 described below. The support screens 290 are formed from an expanded metal to form the through apertures and include embossed rib structures 292. The rib structures 292 are pressed into the support screens 290 to provide increased support for the filter media panels 102, 104. While illustrated as being horizontal rib structures 292 that extend longitudinally between the third and fourth sides 120, 122, 124, 126 of the filter media panels 102, 104 when assembled, the rib structures 292 could have other orientations and shapes. For instance, they could extend vertically, e.g. between first and second sides 112, 114, 116, 118 or could be diagonal or form an X-shape. Preferably, the rib structures 292 extend inward and away from the corresponding media panels 102, 104 so that the rib structures 292 do not interfere with mounting or locating of the filter media panels 102, 104.

This embodiment is also illustrated with optional pleat stabilizers mounted on the inner and outer faces of the filter media panels. The pleat stabilizers may be in the form of molded components mounted to the filter media panels or could be hot melt or urethane beads applied to the filter media panels in a direction extending generally transverse to the edges/tips of the pleats when pleated media is used.

The features of the aforementioned support screens 290 and pleat stabilizers can be equally applied to all embodiments herein, where appropriate and not directly contradicted.

Figure 9:
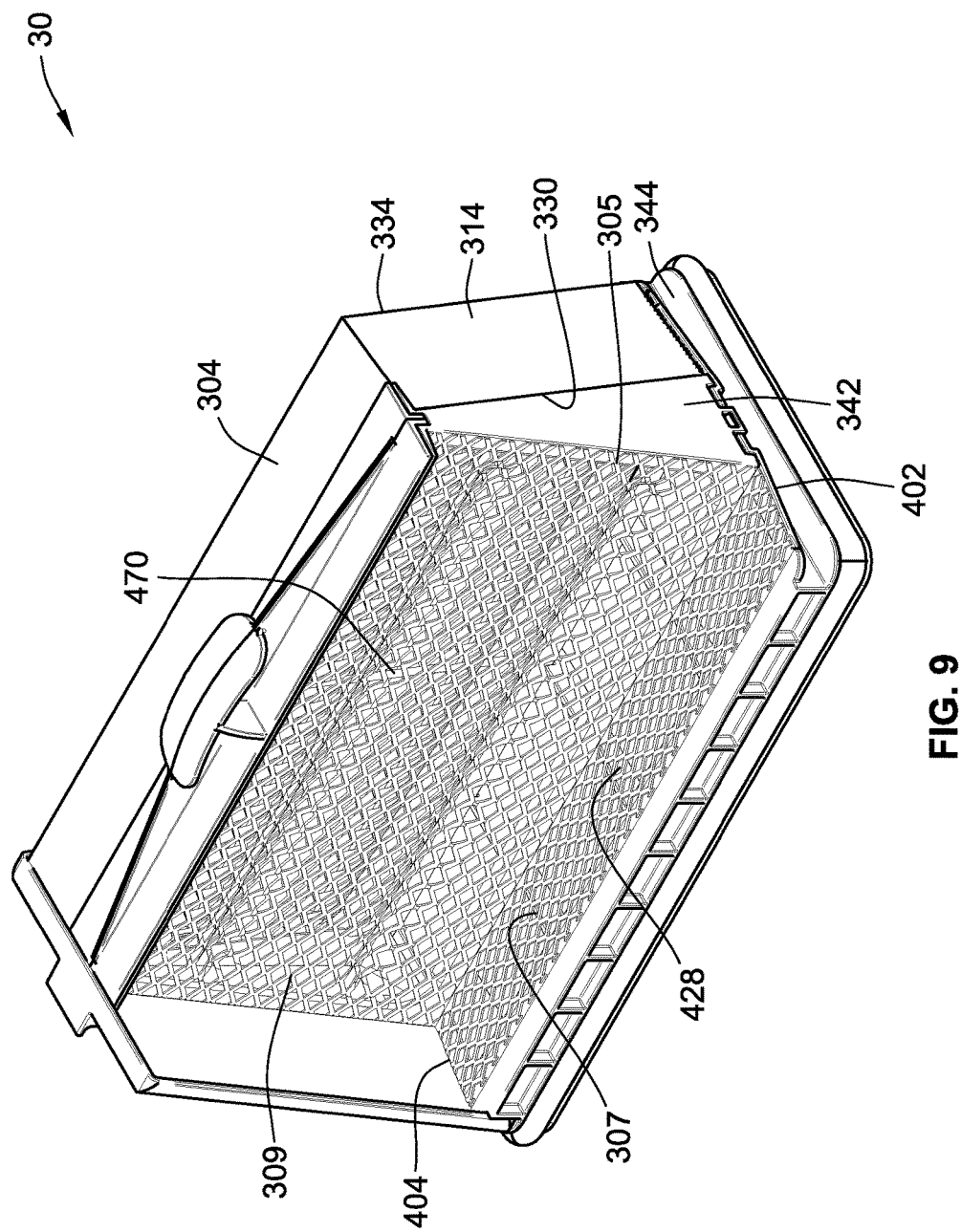
FIG. 9 is a partial perspective illustration of another embodiment of a filter element according to the invention.

FIG. 9 illustrates a further embodiment of a filter element 300 according to the teachings of the present invention. This embodiment is substantially similar to the prior embodiment and only the primary differences will be described. Where not contradicted by context, the features of this embodiment may be used with the structure of the prior embodiment. One of the filter media panels and end cap structures has been removed for ease of understanding.

This filter element 300 is generally designed for an outside-in flow. As such, fluid will flow through the outer faces 334 of the filter media panels 304 (only one is shown) first and then exit the filter element 300 through base from opening 400 formed in the bottom of the base frame 344.

To provide improved support of the filter media panels 304, first and second support screens 305 are provided. Only one of the support screens 305 is readily visible. This support screen 305 would support the filter media panel that has been removed. However, a similar support screen 305 supports filter media panel 304 that is illustrated.

The support screens 305 are positioned between the support frame 342 and base frame 344 and the filter media panels 304. The support frame 342 and base frame 344 support the support screens 305. In the illustrated embodiment, the support screens 305 are generally L-shaped having a first side portion 307 and an inner face portion 309. The first side portion 307 is positioned adjacent the first sides 314 of the filter media panels 304 as well as the outward extending flanges 402, 404 and support members 428. The inner face portion 309 is positioned adjacent the inner faces 130 of the filter media panels 304.

In some embodiments, the first side portion 307 and inner face portion 309 of the support screens are formed from a single piece of material bent to correspond to the L-shape formed by the connected support frame 342 and base frame 344. In alternative embodiments, the first side portion 307 and inner face portion 309 may be formed from separate pieces of screen. Preferably, the support screens are formed from embossed expanded screen material.

Figure 10:
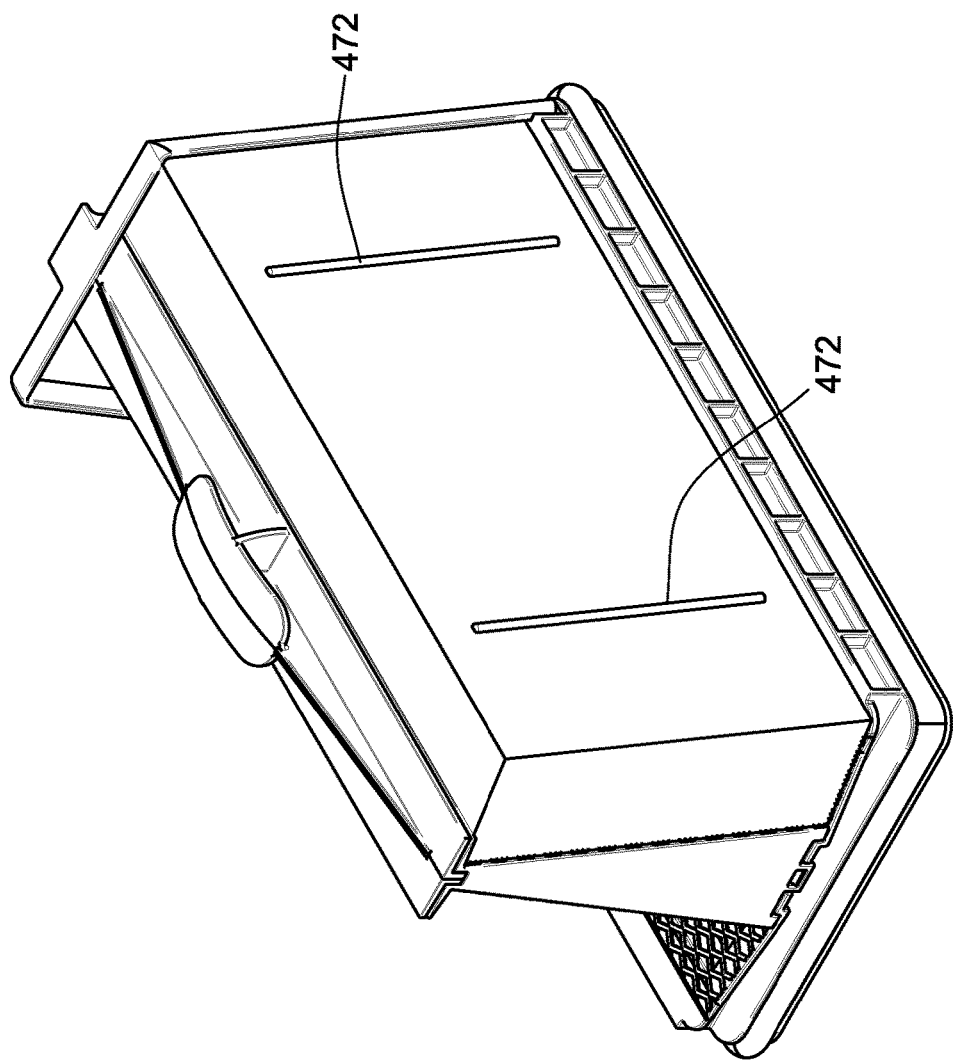
FIG. 10 is a partial perspective illustration of the filter element of FIG. 9.

With additional reference to FIG. 10, this embodiment also utilizes pleat stabilizers 472 when the filter media panels are formed from pleated filter media. The pleat stabilizers 472 provide support to the filter media due to a pressure drop across the filter media panels. The pleat stabilizers 472 may also maintain a desired spacing of the adjacent pleats.

While the end cap structures of the prior embodiments are described as multi-component end caps, other embodiments may utilize one-piece end caps. For instance, the end cap could be formed from a single piece of rigid urethane that is formed around the various components that are to be captured by the end cap structures discussed previously.

Figure 11:
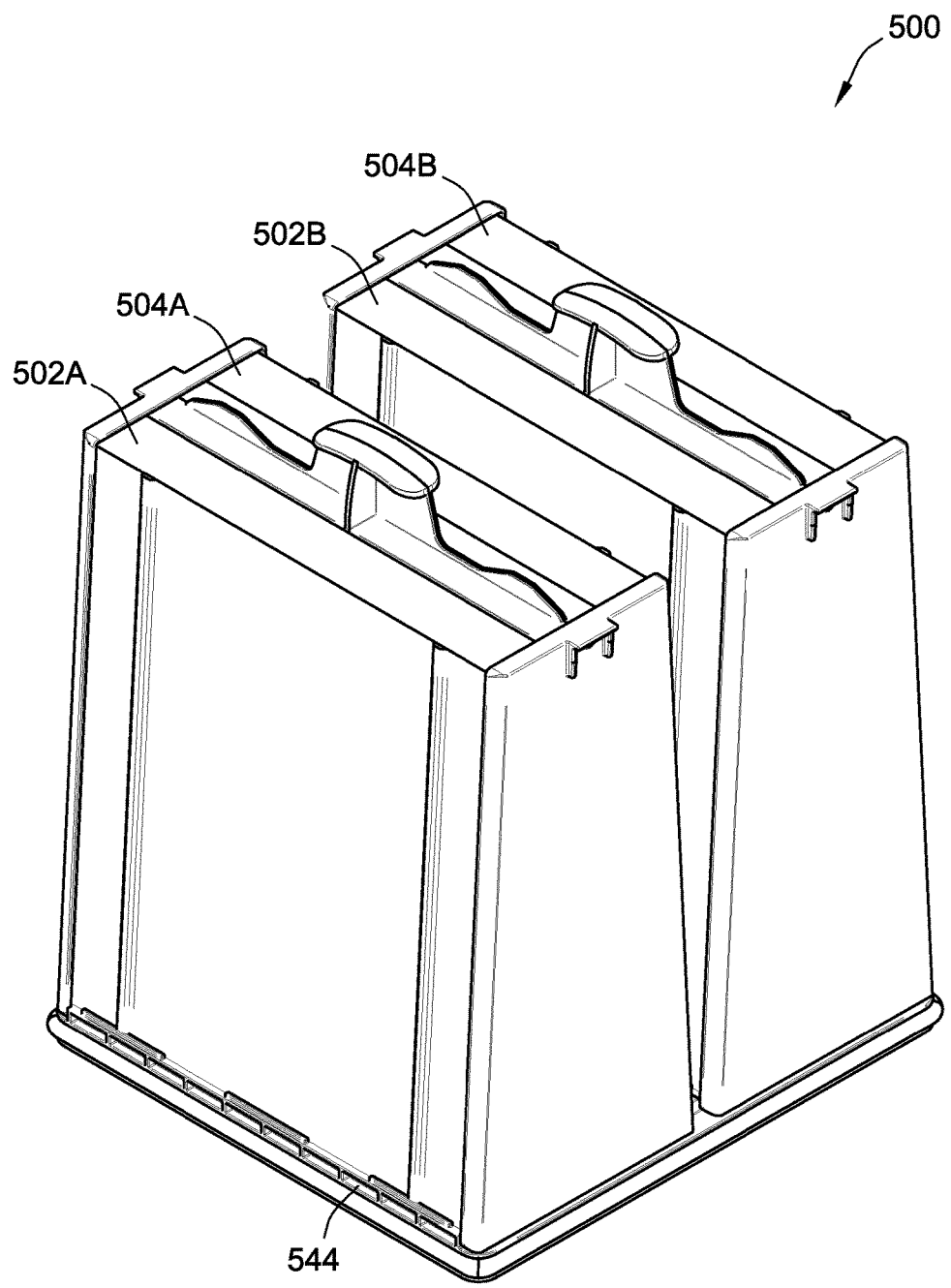
FIG. 11 is a perspective illustration of another embodiment of a filter element according to the invention.

FIG. 11 illustrates a further embodiment of a filter element 500. This embodiment is similar to and can include substantially all of the features of the prior embodiments. However, this embodiment utilizes two banks of filter media panels 502A, 504A and 502B, 504B mounted to a single base frame 544.

Figure 14:
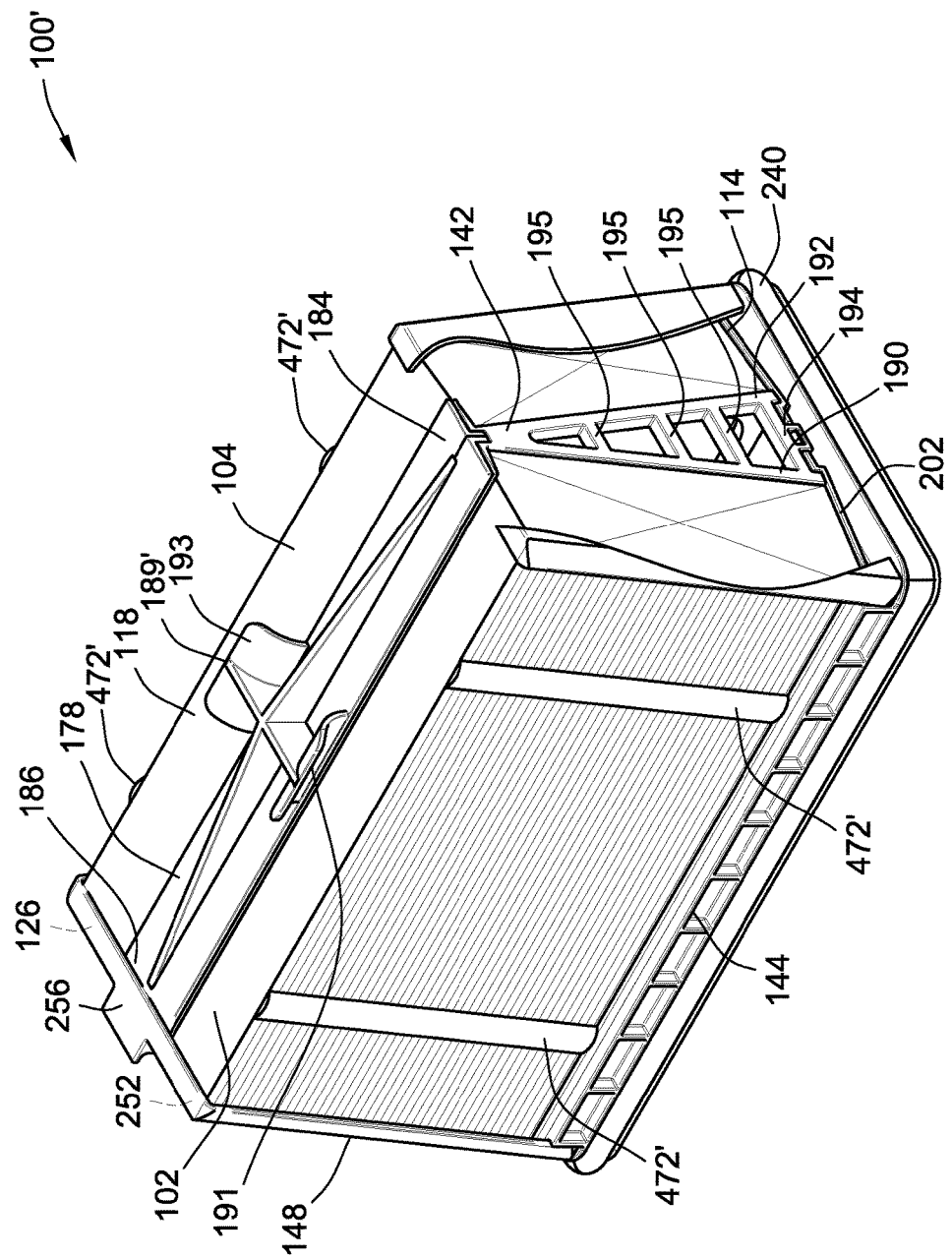
FIG. 14 is a partial perspective illustration of an alternative embodiment of a filter element according to the invention.

FIG. 14 is a partial perspective illustration of a further embodiment of a filter element 100'. This embodiment is similar to and can include substantially all of the features of the prior embodiments. The filter element 100' has an alternative handle 189' having first and second curved portions 191, 193. The filter element 100' has pleat stabilizers 472' extending the entire length of the filter media panels 102,104. In addition, the filter element 100' has intermediate cross-braces 195 that extend between the converging elongated segments 190, 192 that provide additional structural support to the support frame 142. It will be readily understood that the handle 189', pleat stabilizers 472' and cross-braces 195 can be used individually or in combination with any of the embodiments disclosed herein.

Figure 15:
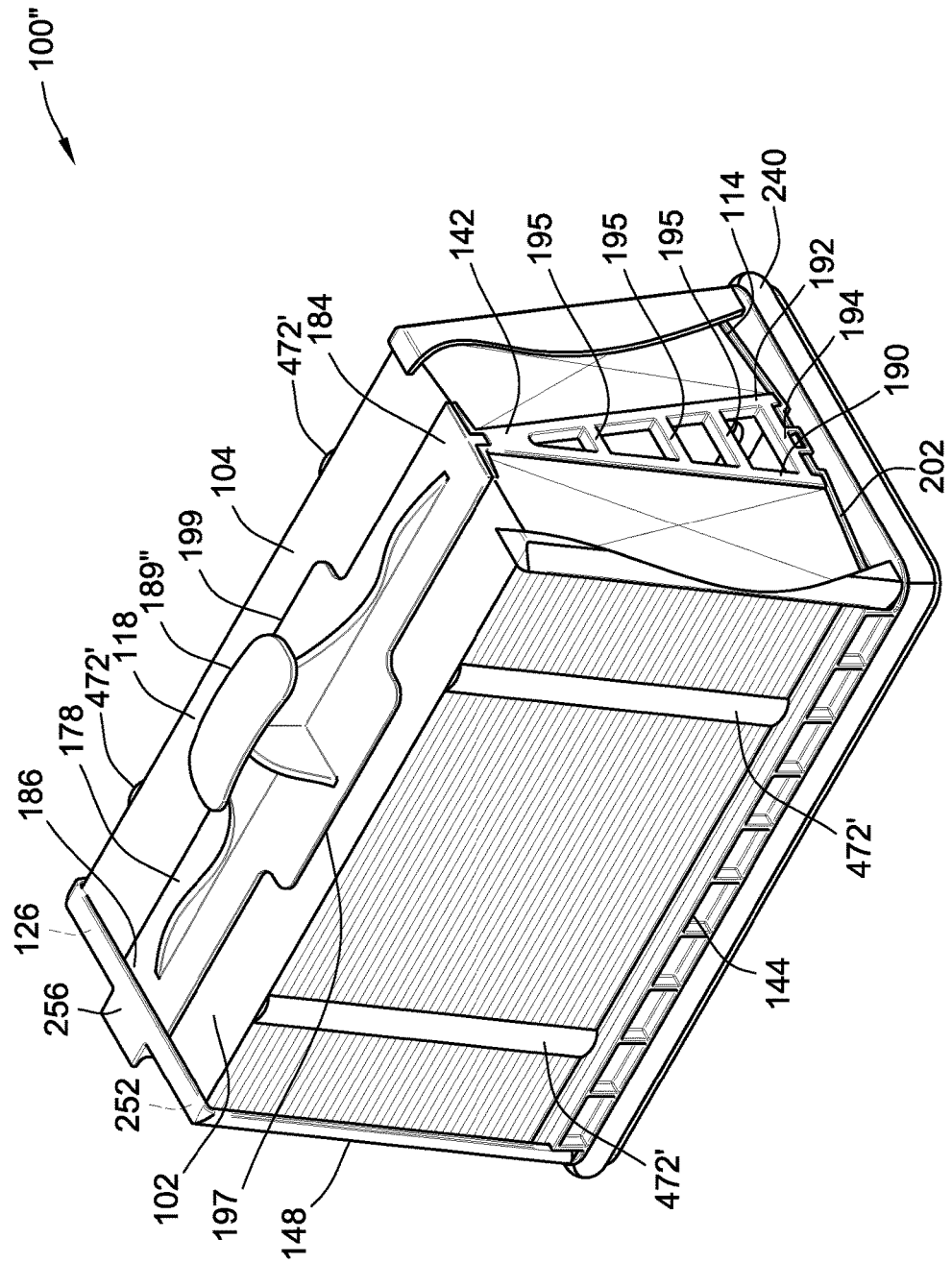
FIG. 15 is a partial perspective illustration of an alternative embodiment of a filter element according to the invention.

FIG. 15 is a partial perspective illustration of a further embodiment of a filter element 100". This embodiment is similar to and can include substantially all of the features of the prior embodiments. The filter element 100" has an alternative handle 189" having first and second handle base flanges 197, 199. The filter element 100" has pleat stabilizers 472' extending the entire length of the filter media panels 102,104. In addition, the filter element 100" has intermediate cross-braces 195 that extend between the converging elongated segments 190, 192 that provide additional structural support to the support frame 142. It will be readily understood that the handle 189", the first and second handle base flanges 197, 199, pleat stabilizers 472' and cross-braces 195 can be used individually or in combination with any of the embodiments disclosed herein.

Figure 16:
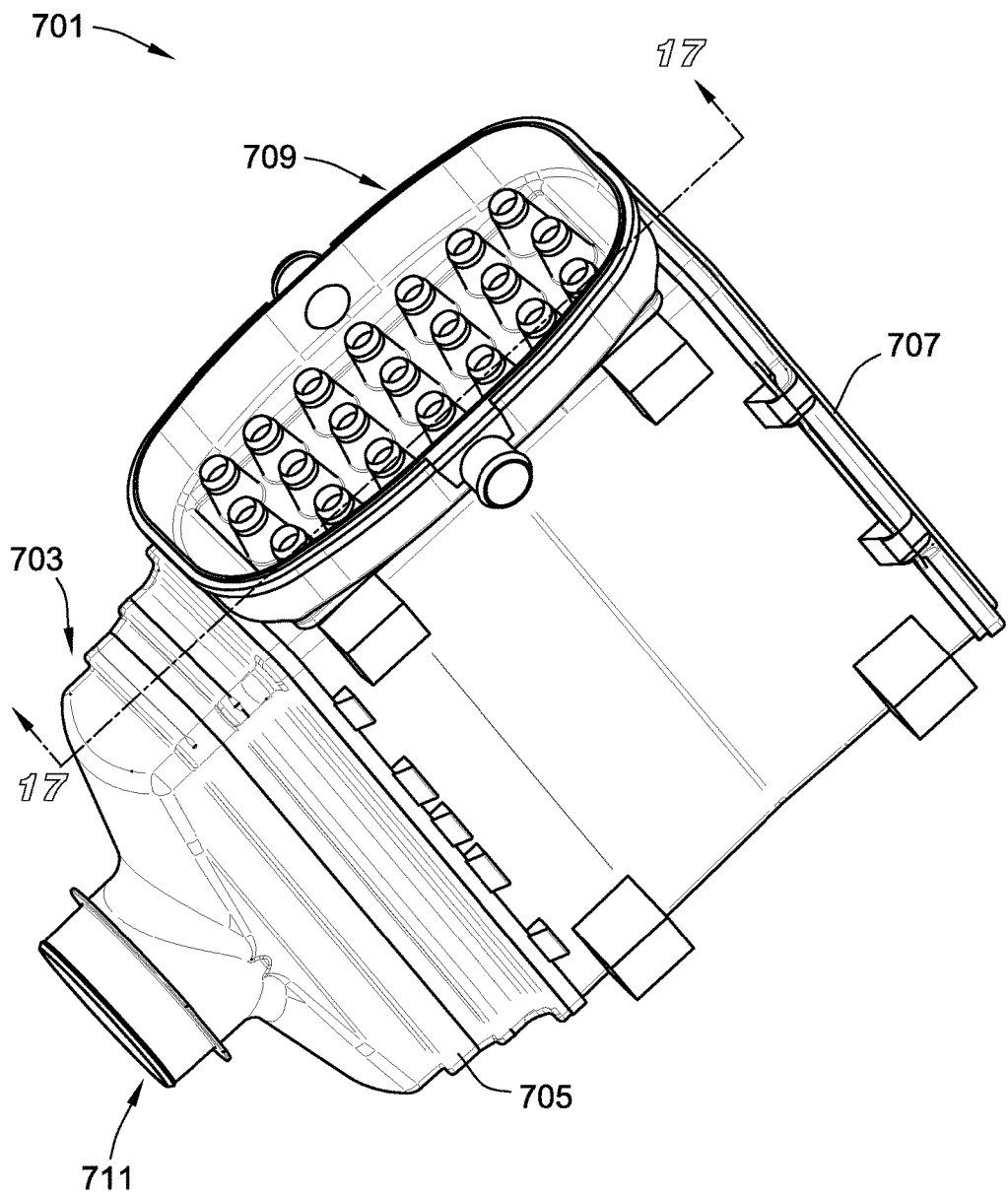
FIG. 16 is a perspective illustration of a filter assembly according to an embodiment of the invention.
Figure 17:
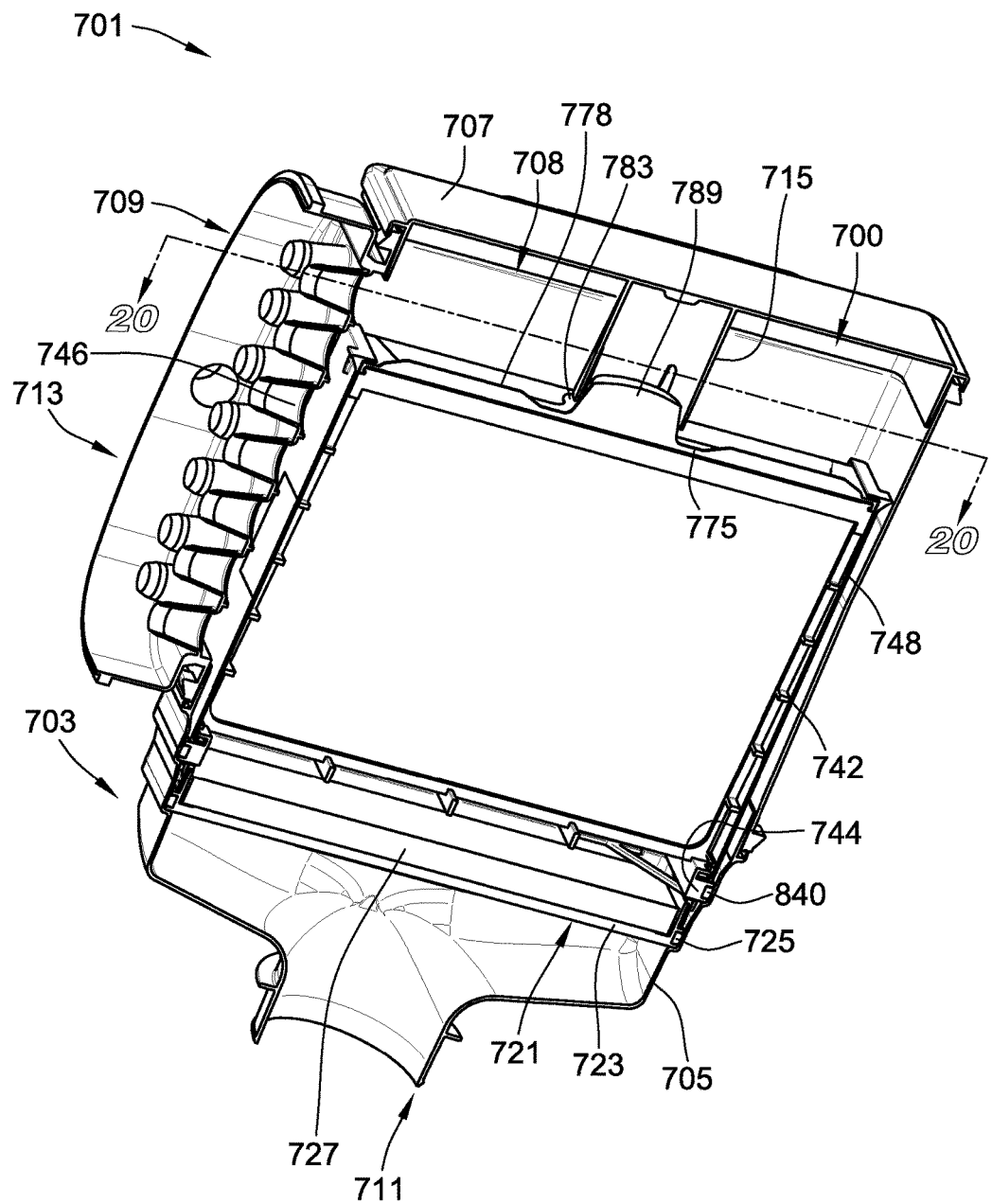
FIG. 17 is a cross-section of the filter assembly of FIG. 16.

FIGS. 16 and 17 illustrate a filter assembly 701 in accordance with an embodiment of the invention. The filter assembly 701 includes a filter housing 703 that houses a filter element 700 (see FIG. 17) for filtering a flow of fluid (typically air) that flows from an unfiltered inlet 709 to a clean air outlet 711 while passing through the filter element 700.

The filter housing 703 generally includes a housing base 705 and a housing lid 707 that define a central cavity 708 interposed between the inlet 709 and the outlet 711. The housing base 705 may be made from multiple components connected together. The housing lid 707 is removable to provide access to the central cavity 708 to provide access to the filter element 700 for replacement of the filter element 700 when it becomes spent.

A pre-cleaner arrangement 713 is positioned proximate the inlet 709 and is upstream of the filter element 700 to help filter larger impurities prior to the air reaching the filter element 700.

The filter element can include most features and structures of the prior filter elements described in FIGS. 1-15. More particularly, the filter element 700 includes a pair of filter media panels 702, 704 (also referred to as media packs) and a multi-component holding assembly configured to mount the filter media panels 702, 704 in the desired orientation. The multi-component holding assembly is similar to those described previously and generally includes a support frame 742 (see FIG. 19), a base frame 744, first and second end cap structures 746, 748 and a second side support structure 778. As illustrated in prior embodiments, the filter media panels 702, 704 the multi-component holding assembly is configured such the filter media panels 702, 704 are canted relative to one another such that the filter media packs converge proximate second sides 716, 718 and diverge, i.e. are spaced apart, proximate sides 712, 714. Here a clean air cavity is formed between inner faces of the filter media panels 702, 704.

The second side support structure 778 is connected to the filter media panels 702, 704 as described above with reference to FIGS. 7 and 8. The second side support structure 778 may also be referred to as a handle frame as it supports handle 789. The second side support structure 778 bridges any gap formed between the adjacent second sides 716, 718 of the filter media panels 702, 704.

The base frame 744 carries a sealing gasket 840 used to seal the filter element 700 to a filter housing 703 (see FIG. 17). The sealing gasket 840 in the illustrated embodiment is a continuous piece of D-style rope stock. In this embodiment, the sealing gasket 840 defines a radially directed seal with a radially inner surface of the housing base 705. However, axial seals could be provided. The seal provided by sealing gasket 840 prevents dirty air from bypassing the filter element 700 as it flows from inlet 709 to outlet 711. The sealing gasket 840 alone or in combination with other components such as base frame 744 may be considered a housing seal system.

With reference to FIG. 17, in the illustrated embodiment, the housing lid 707 includes an inward extending tubular projection 715. Among other things, the tubular projection 715 can be used to make sure that the filter element 700 is axially inserted far enough into the filter housing 703.

The second side support structure 778 of this embodiment is configured to provide improved protection of the filter media of the filter media panels 702, 704, particularly during installation of the filter element 700 into the filter housing. The second side support structure 778 includes a central bridge element that spans the region between the second sides 716, 718 of the filter media panels 702 704. A plurality of shield elements in the form of wing panels 777, 781 and 783 project laterally from the bridge element 775 out over the second sides 716, 718 for protecting the filter media defining second sides 716, 718 of the filter media panels 702, 704. The shield elements extend over the end region, e.g. second sides 716, 178 of the filter media packs. The shield elements, e.g. wing panels 777, 781, 783 provide a location where a user directly or indirectly (e.g. via projection 715) can apply axial pressure to the filter element 700 to press the filter element 700 into the filter housing 703 through the opening of the filter housing 703 covered by housing lid 707.

Figure 8:
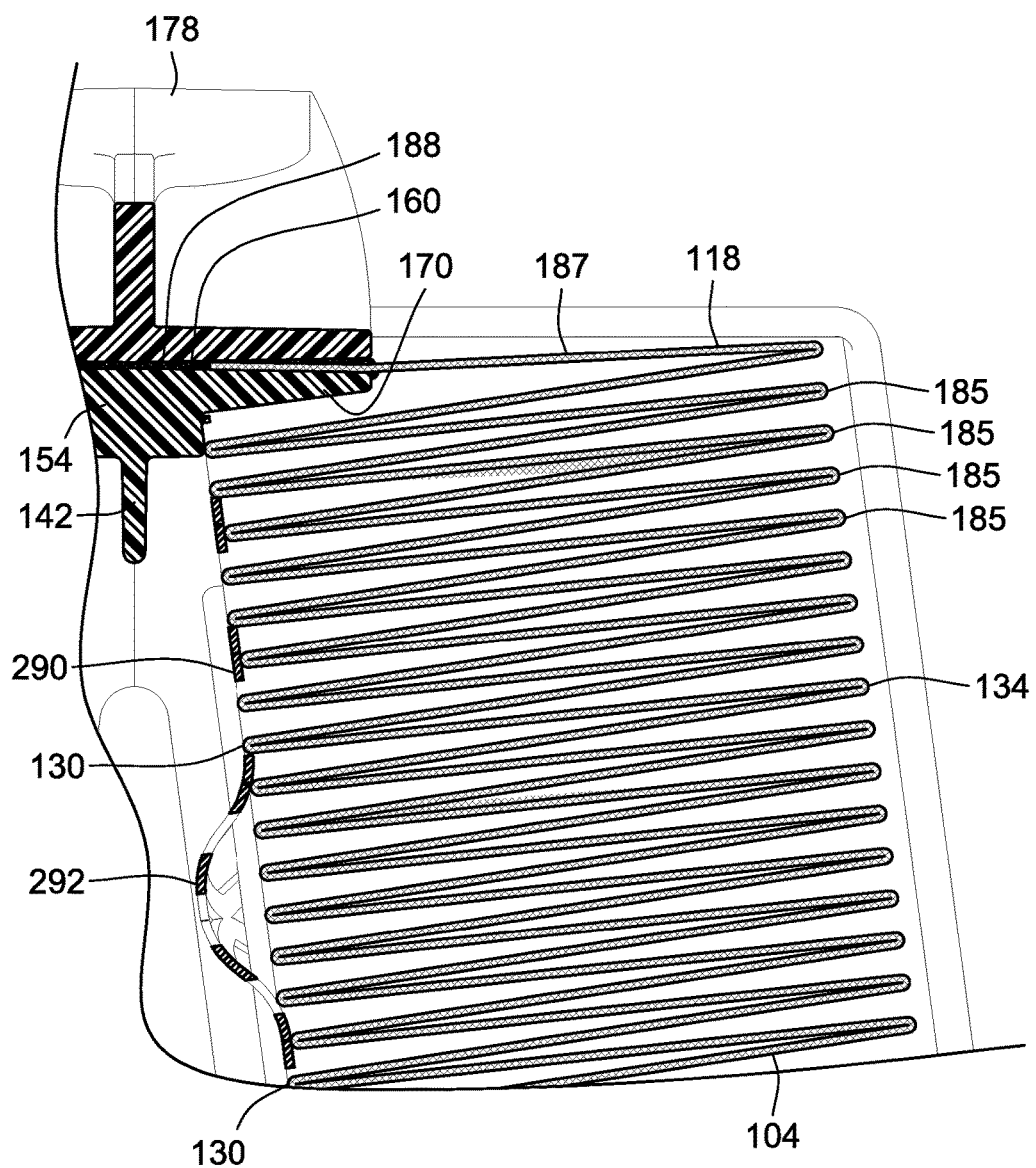
FIG. 8 is an enlarged partial cross-sectional illustration of the filter element of FIG. 1.

These wing panels 777, 781, 783 are beneficial when filter media panels 702, 704 are formed from pleated filter media with the pleat panels extending generally parallel to second sides 716, 718, i.e. oriented such as illustrated in FIG. 8. The pleat panels, and corresponding folds (also illustrated in FIG. 8), of the filter media panels 702, 704 extend laterally between the third and fourth sides 720, 722 and 724, 726 and corresponding end cap structures 746, 748. With the pleat panels oriented in this manner, if a user applies pressure to the pleat panel direction to push the filter element into the filter housing 703 tearing of the filter media proximate the end cap structures 746, 748 can occur as there is limited axial support for the filter media pleat panels. Further, wing panel 783 helps prevent projection 715 from pressing directly on the pleat panel.

In this embodiment, the wing panels 777, 781, 783 extend on both sides of bridge element 775. However, other embodiments could have wing panels that are formed on only a single side of the bridge element 775. Further, in the illustrated embodiment, the second side support structure 778 including the bridge element 775 and wing panels 777, 781 and 783 are formed from a single molded plastic component and then operably secured to the rest of the frame components as further described with regard to prior embodiments.

Figure 18:
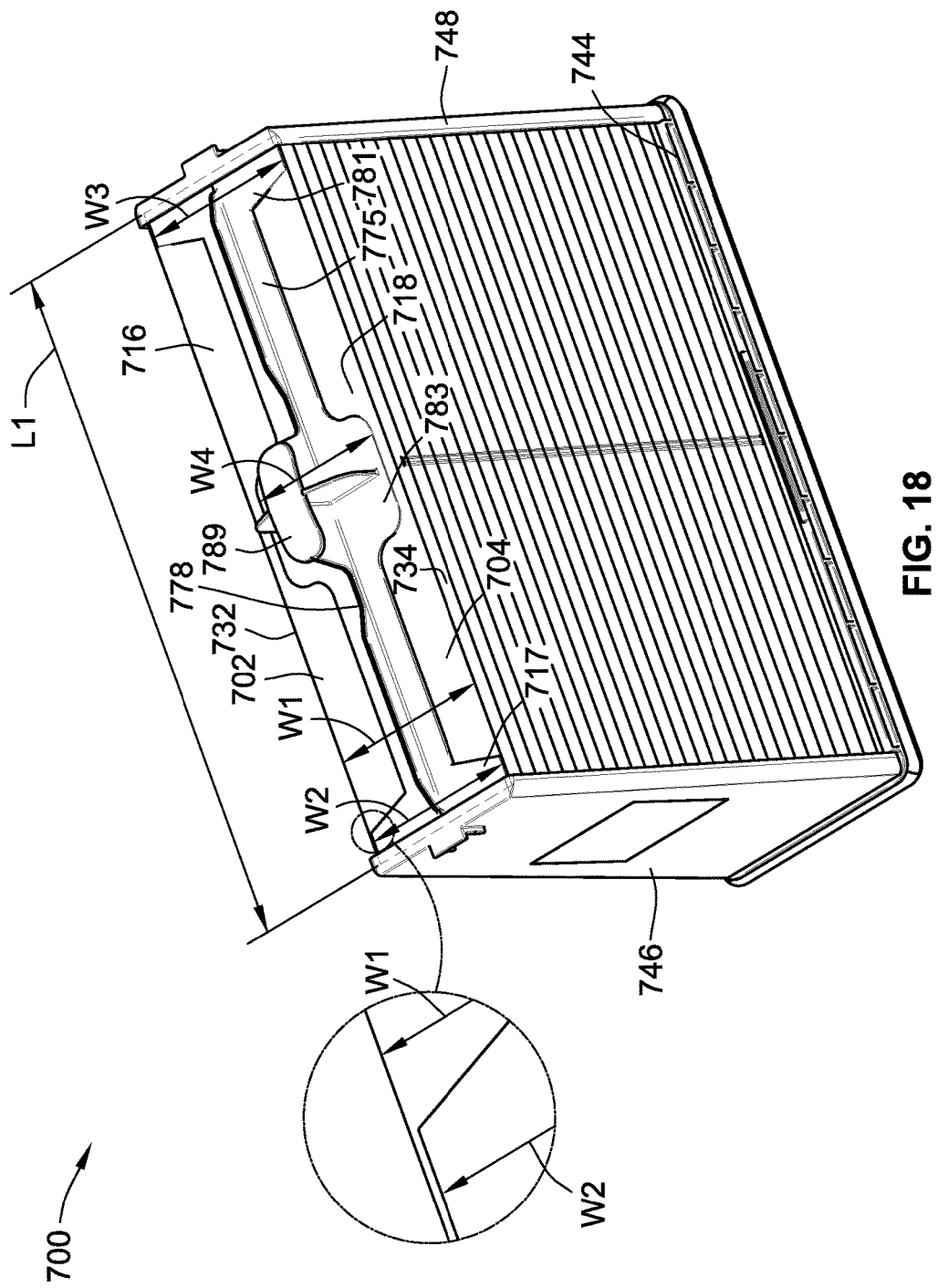
FIG. 18 is a perspective illustration of the filter element of the filter assembly of FIG. 16.
Figure 19:
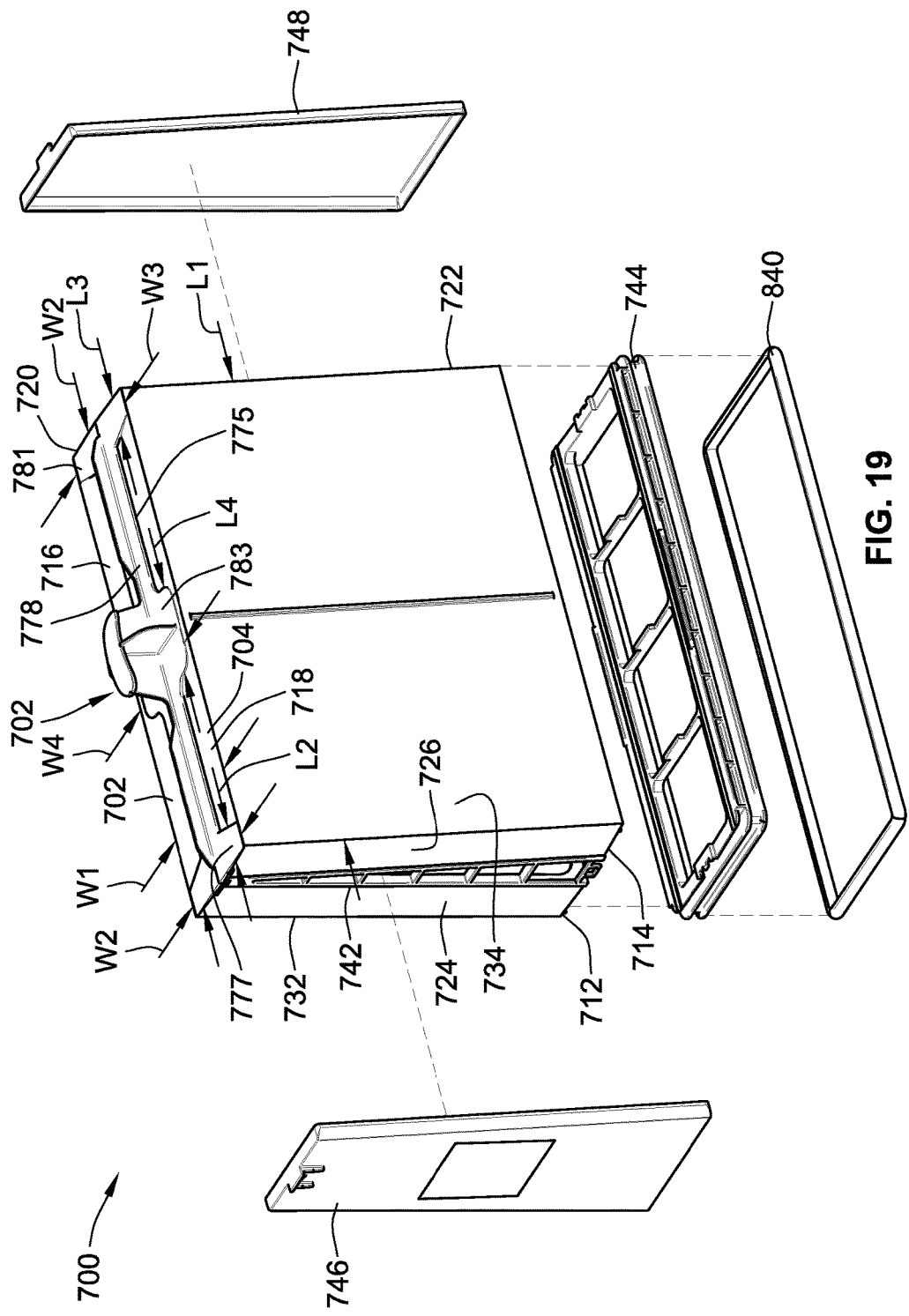
FIG. 19 is an exploded illustration of the filter element of FIG. 18.

With reference to FIGS. 18 and 19, the second sides 716, 718 of filter media panels 702, 704 define a width W1 between opposed outer faces 732, 734. Wing panels 777, 781, 783 have widths W2-W4. Widths W1-W4 are transverse to a length L1 of the filter media panels 702, 704 proximate second sides 716, 718, which define an end of the filter element. In an embodiment, the widths W2-W4 are at least 40% the width W1 defined by the filter media panels 702, 704. More preferably, the widths W2-W4 are at least 75% the width W1 and more preferably at least 90% of width W1. In some embodiments, the wing panels 777, 781, 783 could have widths W2-W4 that are equal to or greater than width W1.

In some embodiments, width W1 is between 3 and 5 inches and more preferably between 3.5 and 4.5 inches. In some embodiments, widths W2 and W3 are between 2.5 inches and 5 inches and more preferably between 3.5 and 4.5 inches. In some embodiments, width W4 is between 2.5 and 5 inches and more preferably between 3 and 4 inches.

Further, the length L1 is measured between third sides 720, 722 and fourth sides 724, 726. The wing panel 777, 781, 783 have lengths L2-L4 measured parallel to length L1. Preferably, lengths L2-L4 are at least 5% of length L1. In some embodiments, length L4 is at least 10% of length L1. In a representative example, length L1 is between 10 and 20 inches and more preferably between 13 and 17 inches. Preferably, lengths L2 and L3 are at least 0.5 inches and more preferably at least 0.75 inches and more preferably at least 0.85 inches. Length L4 is preferably at least 2 inches and more preferably at least 2.5 inches and more preferably at least 3 inches.

To improve strength, wing panels 777 and 781 have a tapering length when moving towards bridge element 775.

More particularly, the portion of the wing panels 777, 781 furthest from the bridge element 775 have a smaller length than the portion of the wing panels 777, 781 proximate the bridge element 775 where the wing panels 777, 781 transition into the bridge element 775. For instance, in some embodiments, the length proximate the bridge element may be between 0.75 and 1.5 inches and more preferably between 1.15 inches and 1.35 inches.

In the illustrated embodiment, the end cap structures 746, 748 are cup shaped including a panel section and an outward extending annular wall that define a cavity. The outer most edges of the wing panels 777, 781 extend into the cavity formed by the annular wall of end cap structures 746, 748 such that opposed ends of the second side support structure 778 are received in the correspondence end cap structures 746, 748. Due to this configuration, a portion of wing panels 777, 781 are hidden within the end cap structures 746, 748 while another portion is exterior of the end cap structures 746, 748 and exposed. As discussed above, this allows for proper sealing of the filter media panels 702, 704 to prevent undesirable fluid bypass. Preferably, a greater extent of the lengths L2, L3 of the wing panels 777, 781 extends out of the end cap structures 746, 748 than is received and hidden therein. In a preferred embodiment, the annular wall of the end cap that overlaps the wing panels 777, 781 overlap the wing panels 777, 781 by less than 0.5 inches and at least 0.25 inches. In a preferred embodiment, the exposed portion of lengths L2, L3 of the wing panels 777, 781 is at least 0.4 inches and more preferably at least 0.5 inches.

In some embodiments, the shield elements could cover the entire length L1 and width W1 of second sides 716, 718 of the filter media panels 702, 704. However, this arrangement would increase flow restriction.

A handle 789 is spaced away from the wing panel 783 and is used for removing the filter element 700 from the housing 703 at maintenance intervals. As illustrated in FIG. 17, handle 789 is received within an open free end of tubular projection 715 when installed within housing 703.

The filter assembly 701 further includes a safety filter 721 downstream from filter element 700 and upstream from the outlet 711 of the filter housing 703. The safety filter 721 assists in protecting any downstream systems in the event of a failure of the filter element 700. Filter element 700 may also be referred to as a primary filter element.

Safety filter 721 includes a frame 723 that carries a seal element 725 for sealing with filter housing 703. The frame 723 is downstream from and supports filter media 727. Filter media 727 may take many forms but is most typically a panel of pleated filter media.

Figure 20:
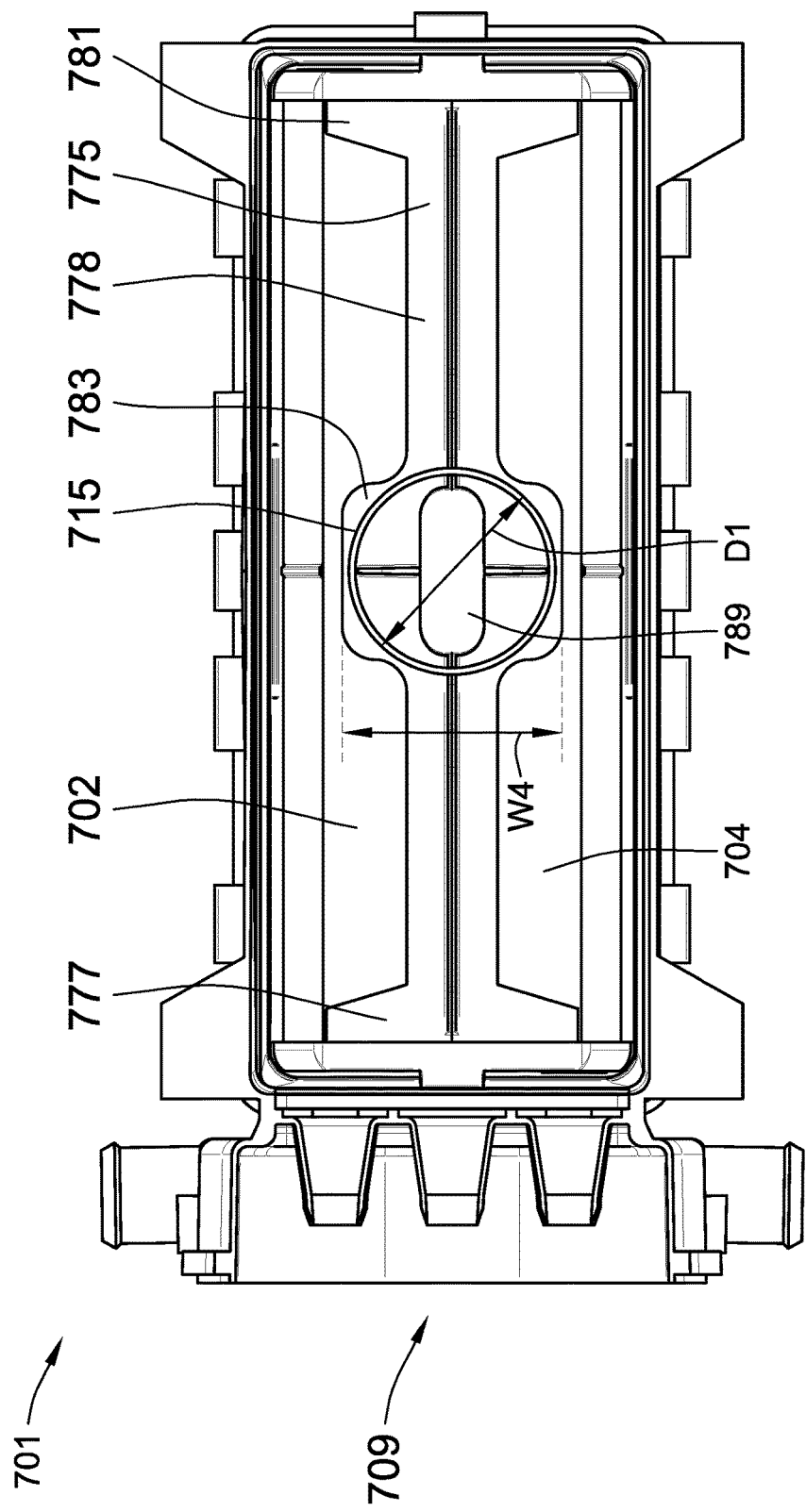
FIG. 20 is a cross-section of the filter assembly of FIG. 16.
Figure 21:
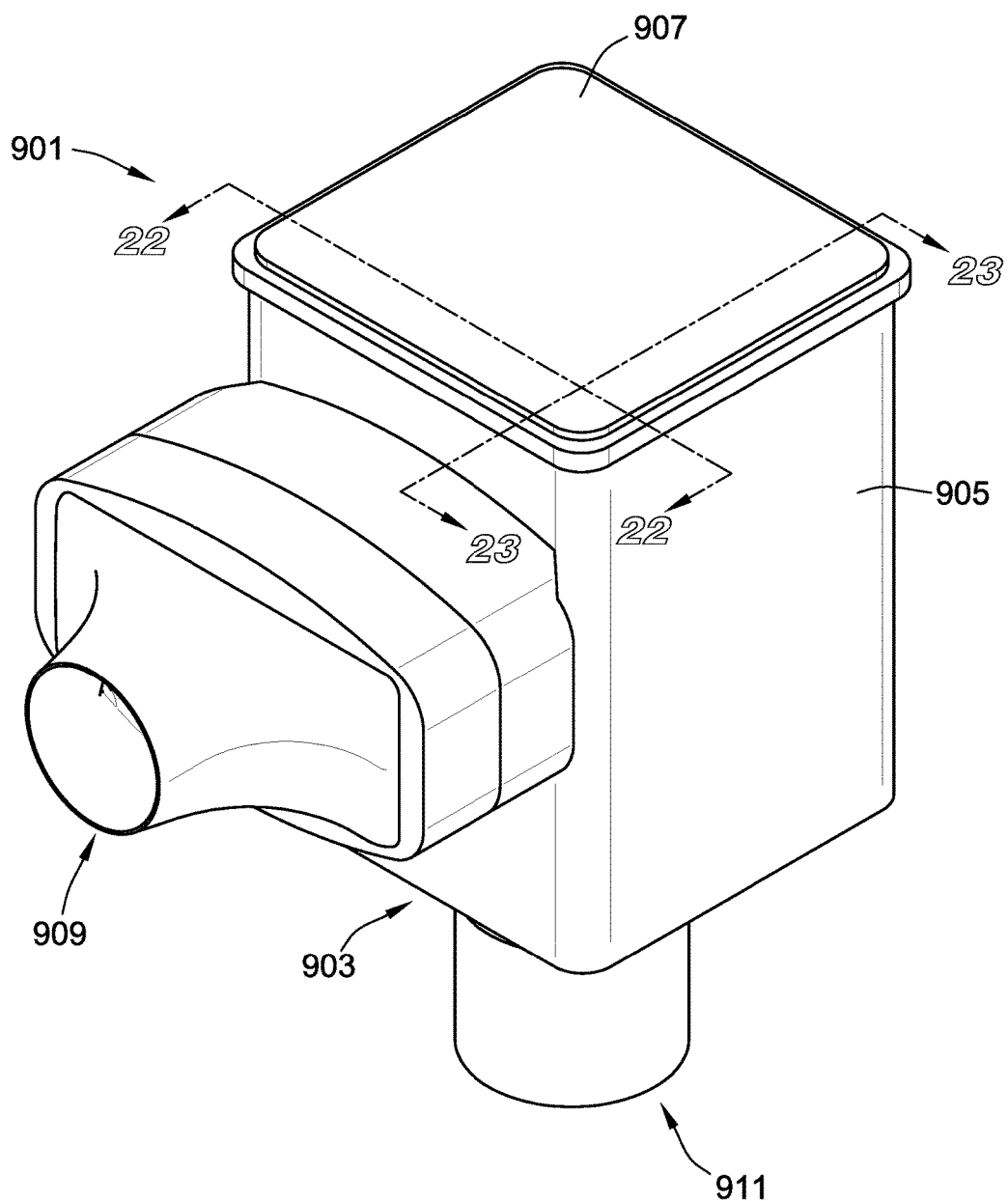
FIG. 21 is a perspective illustration of a further filter assembly according to an embodiment of the invention.

As illustrated in FIG. 20, the outer perimeter of tubular projection 715 is smaller than wing panel 783. More particularly, the diameter D1 of the outer perimeter of tubular projection 715 is smaller than or equal to the width W4 of wing panel 783. This relative relationship prevents the free end of the tubular projection 715 from coming into contact with the outer most panel(s) of the media pack and damaging the integrity of the filter media. The inner periphery of the tubular projection 715 is sized to receive the handle 789.

FIGS. 21-25 illustrate a filter assembly 901 according to another embodiment. The filter assembly 901 is similar in many respects to filter assembly 701 except it includes a filter element 900 (see e.g. FIGS. 22-25) that is similar to filter element 500. More particularly, the filter element 900 of this embodiment utilizes two banks of filter media panels 902A, 904A and 902B, 904B mounted to a single base frame 944.

The filter housing 903 includes a housing base 905 and a housing lid 907. The filter housing 903 include inlet 909 and outlet 911.

Figure 24:
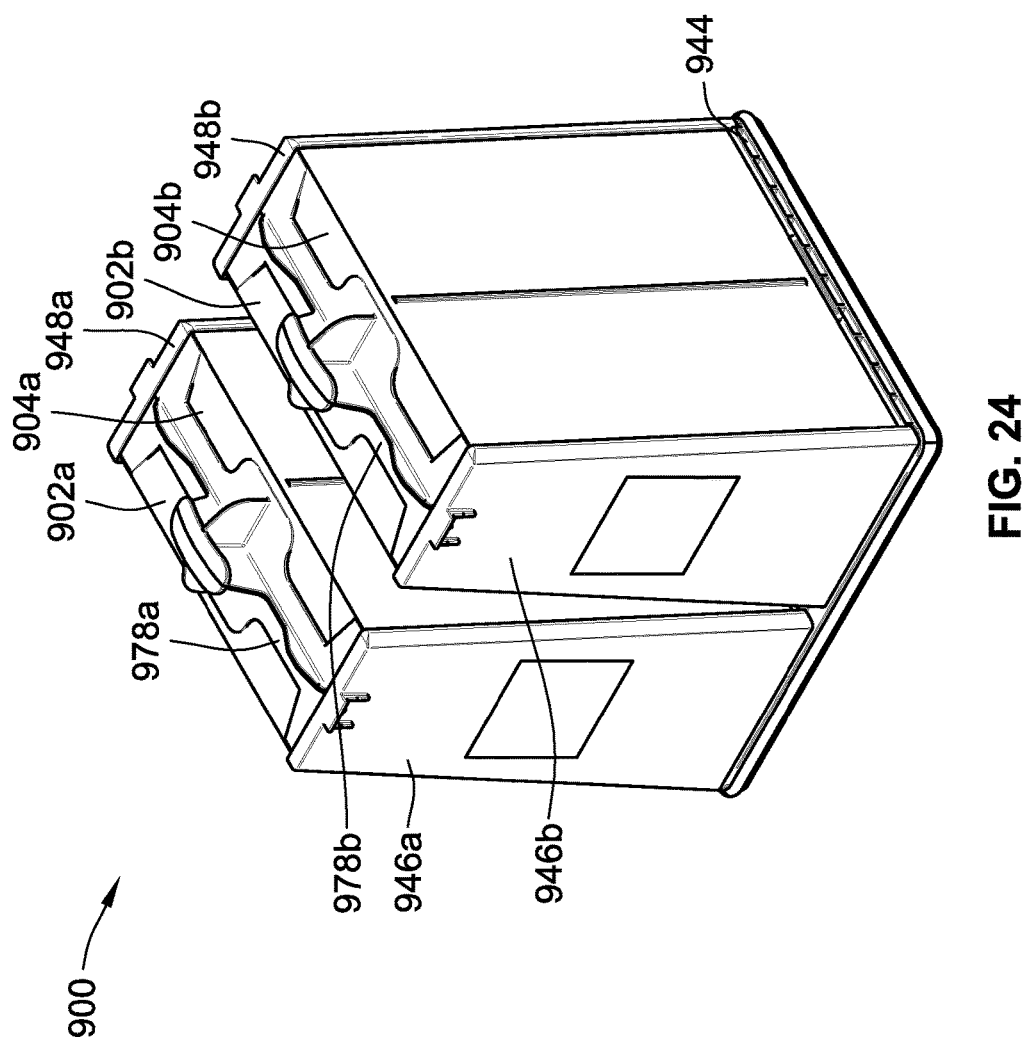
FIG. 24 is a perspective illustration of the filter element of the filter assembly of FIG. 21.
Figure 25:
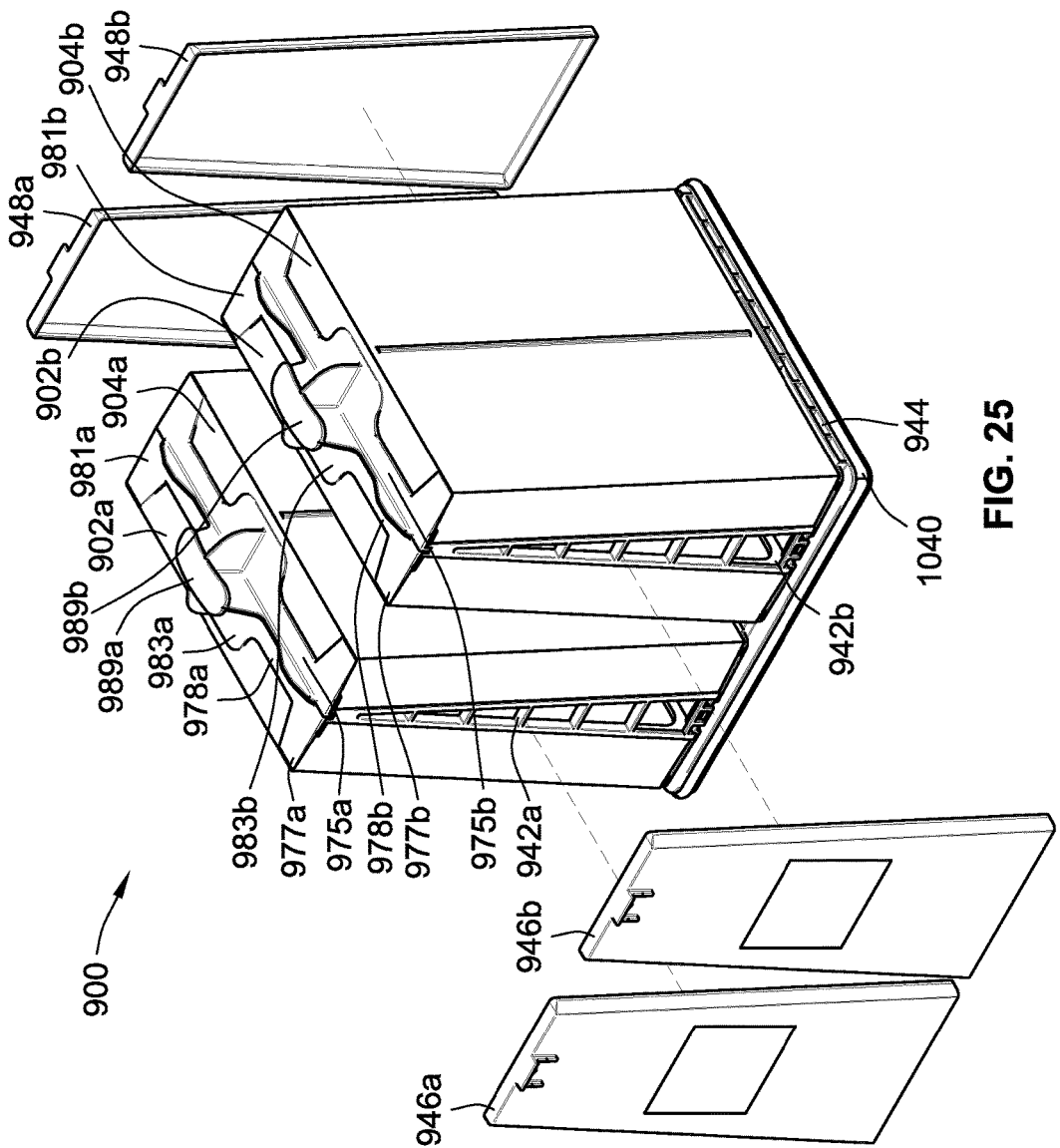
FIG. 25 is an exploded illustration of the filter element of FIG. 24

With principle reference to FIGS. 24 and 25, the filter element 900 includes a pair of banks of filter media panels 902A, 904A and 902B, 904B (also referred to as media packs) and a multi-component holding assembly configured to mount the filter media panels 902A, 904A and 902B, 904B in the desired orientation. The multi-component holding assembly is similar to those described previously and generally includes a pair of support frames 942A, 942B (see FIG. 19), a base frame 944, first and second end cap structures 946A, 948A and 946B, 948B and a pair of second side support structures 978A, 978B. As illustrated in prior embodiments, the multi-component holding assembly is configured such that the filter media panels 902A, 904A and 902B, 904B of each bank are canted relative to one another such that the filter media packs converge proximate second sides and diverge, i.e. are spaced apart, proximate the opposed sides. Here a clean air cavity is formed between inner faces of the corresponding sets of filter media panels 902A, 904A and 902B, 904B, respectively.

The second side support structures 978A, 978B are connected to the corresponding banks of filter media panels 902A, 904A and 902B, 904B as described above. The second side support structures 978A, 978B may also be referred to as a handle frame as it supports handles 989A, 989B. The second side support structures 978A and 978B bridge any gap formed between the adjacent second sides of the corresponding filter media panels 902A, 904A and 902B, 904B of the corresponding bank of filter media panels. More particularly, each second side support structure 978A, 978B includes a central bridge element 975A, 975B. Each second side support structure 978A, 978B also includes A plurality of shield elements in the form of wing panels 977A, 981A, 983A, 977B, 981B, 983B that project laterally from the bridge elements 975A, 975B.

Figure 22:
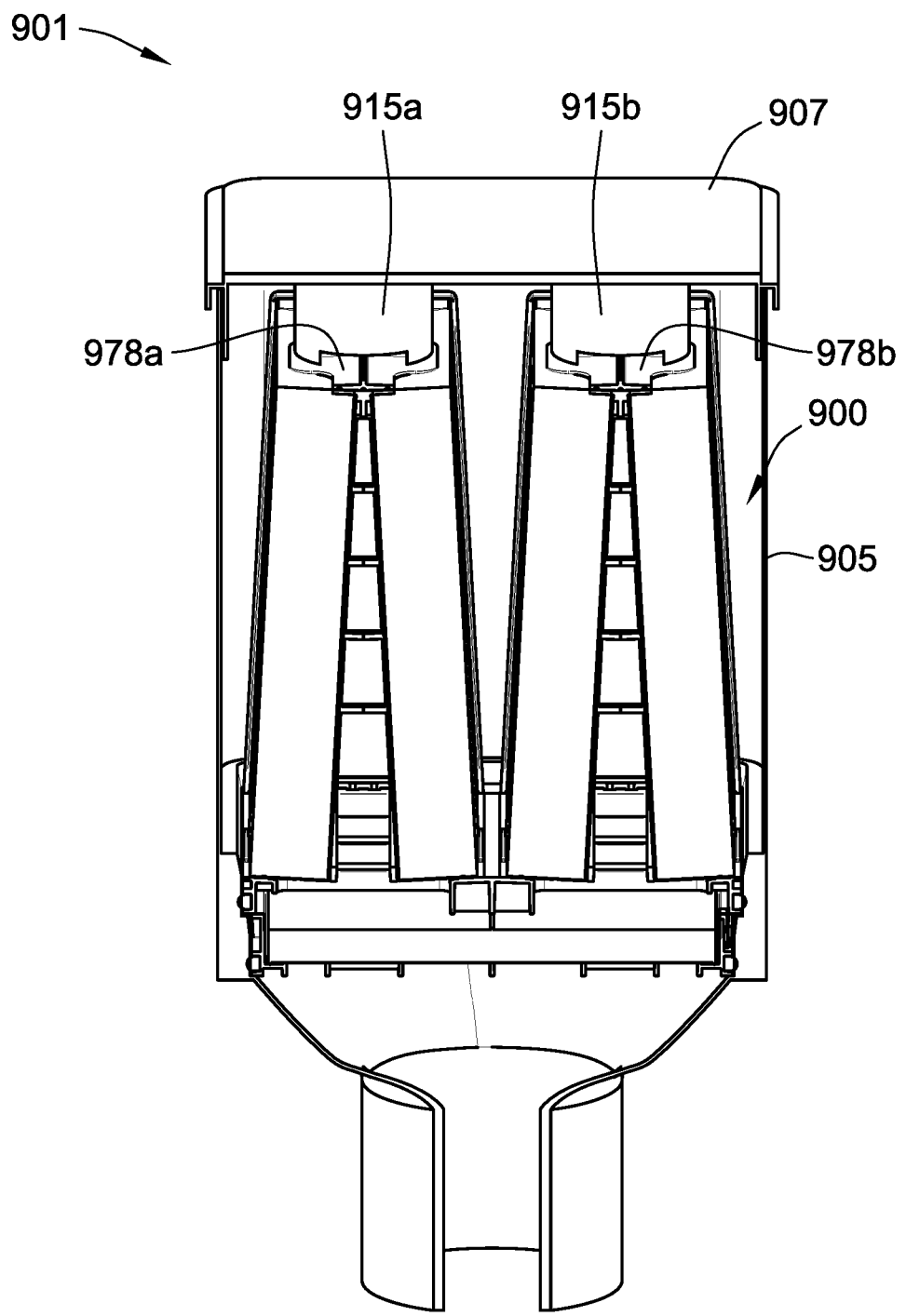
FIG. 22 is a cross-section of the filter assembly of FIG. 21.
Figure 23:
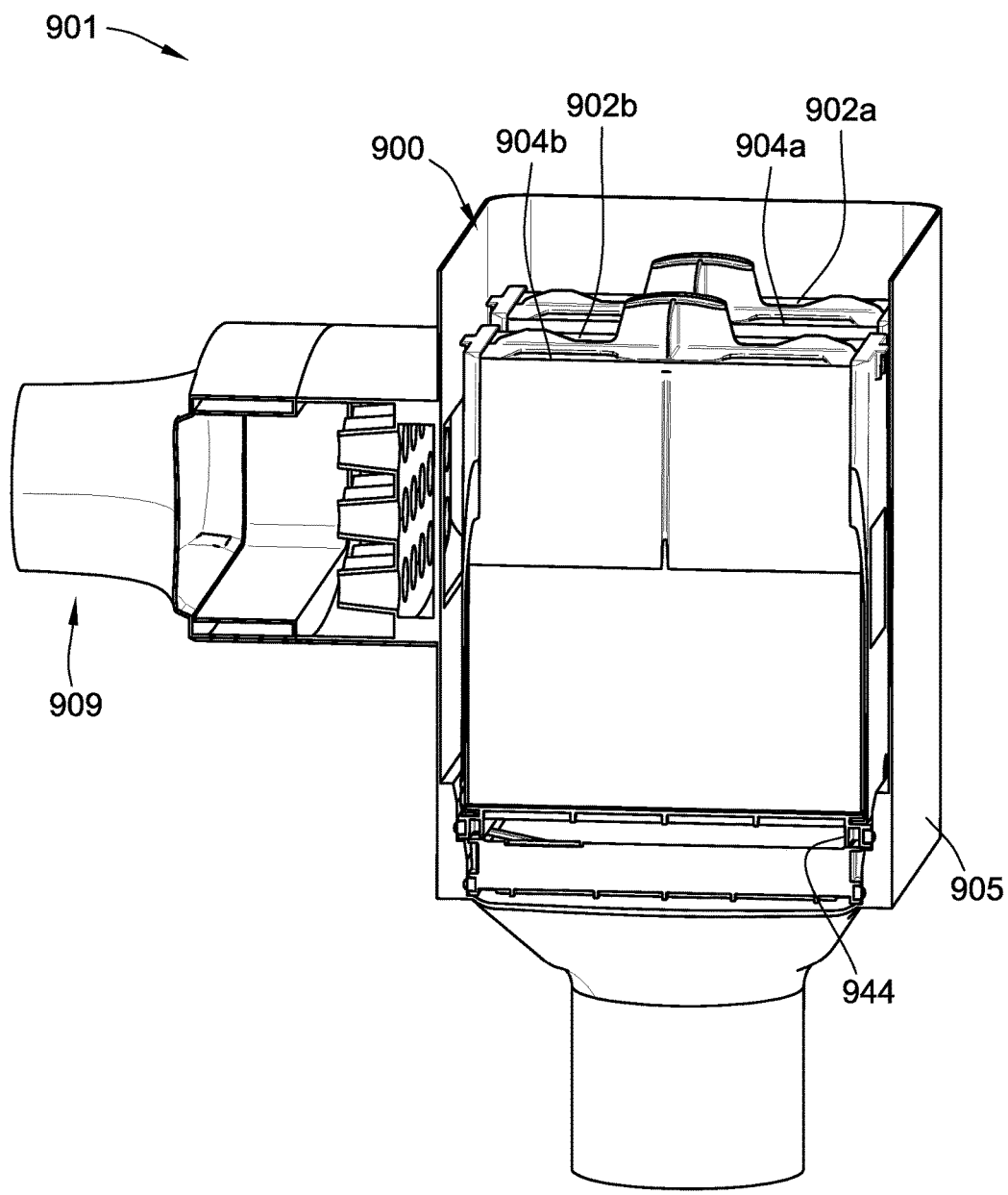
FIG. 23 is a cross-section of the filter assembly of FIG. 20 with the housing lid removed.

With reference to FIG. 22, the housing lid 907 includes a pair of tubular projections 915A, 915B that cooperate with the corresponding handles of the second side support structures 978A, 978B.

The dimensions described above for filter element 700 apply to each bank of filter media panels of filter element 900.

Figure 26:
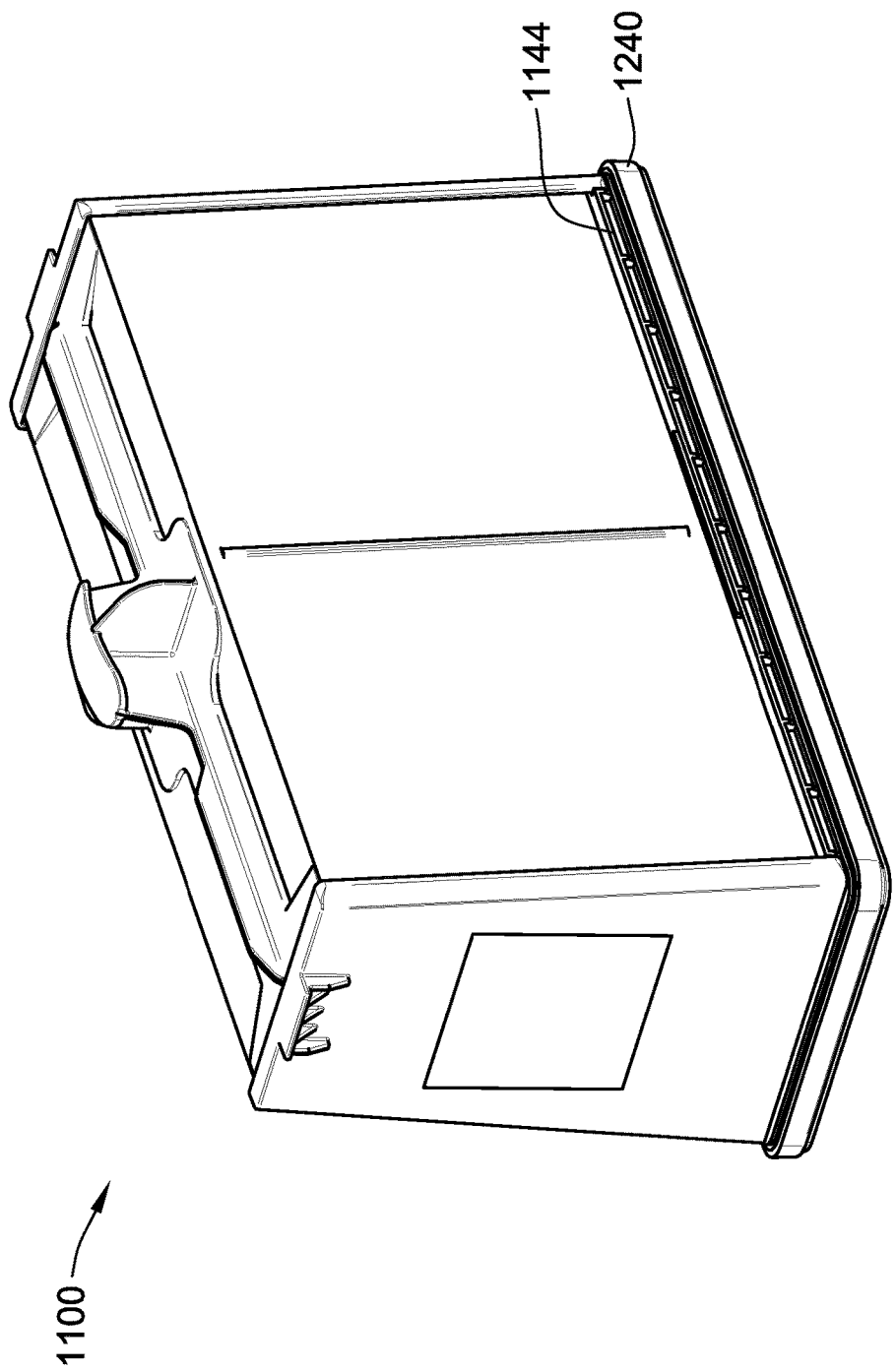
FIG. 26 is a perspective illustration of another embodiment of a filter element according to the invention.
Figure 27:
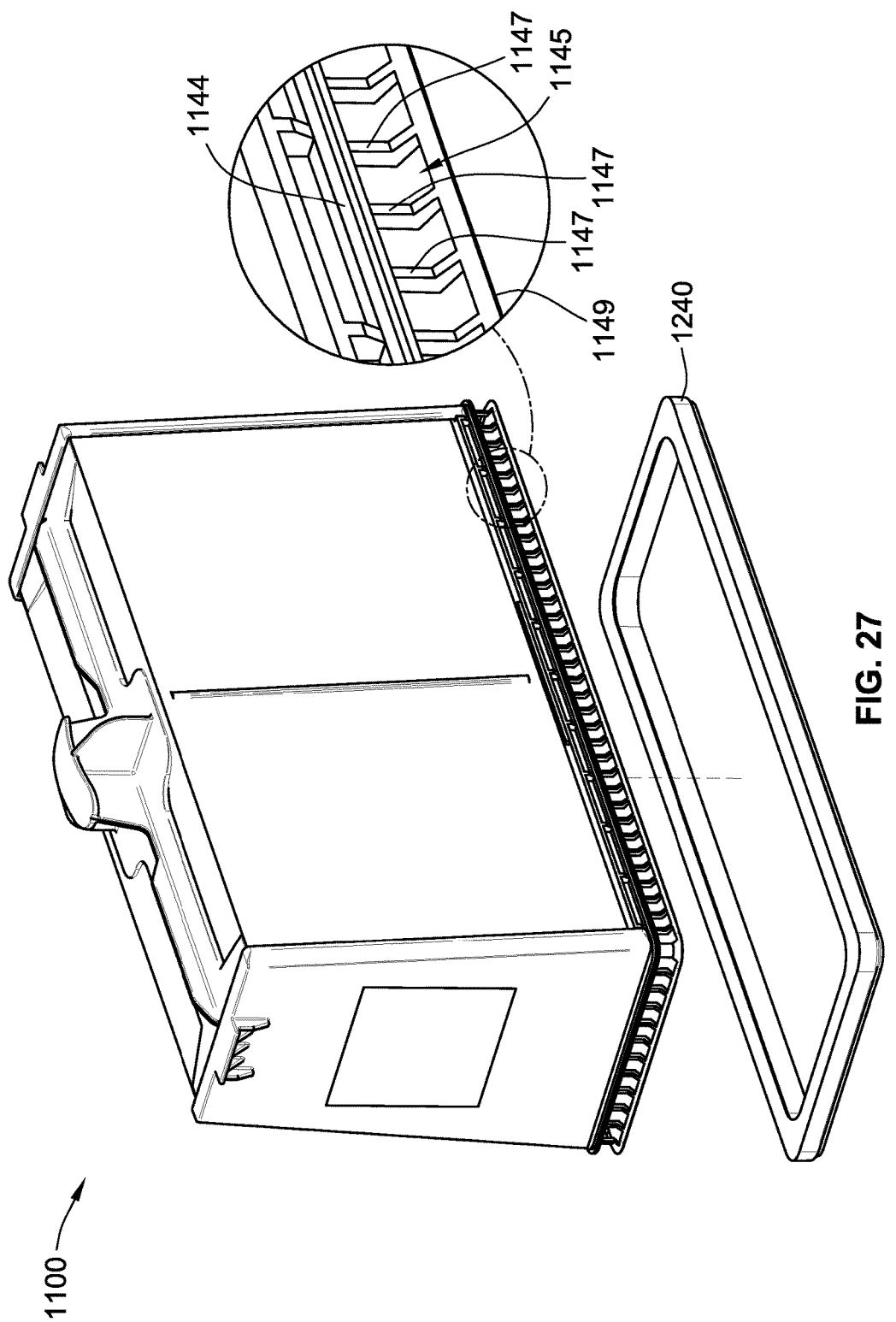
FIG. 27 is a partial exploded illustration of the filter element of FIG. 26.
Figure 28:
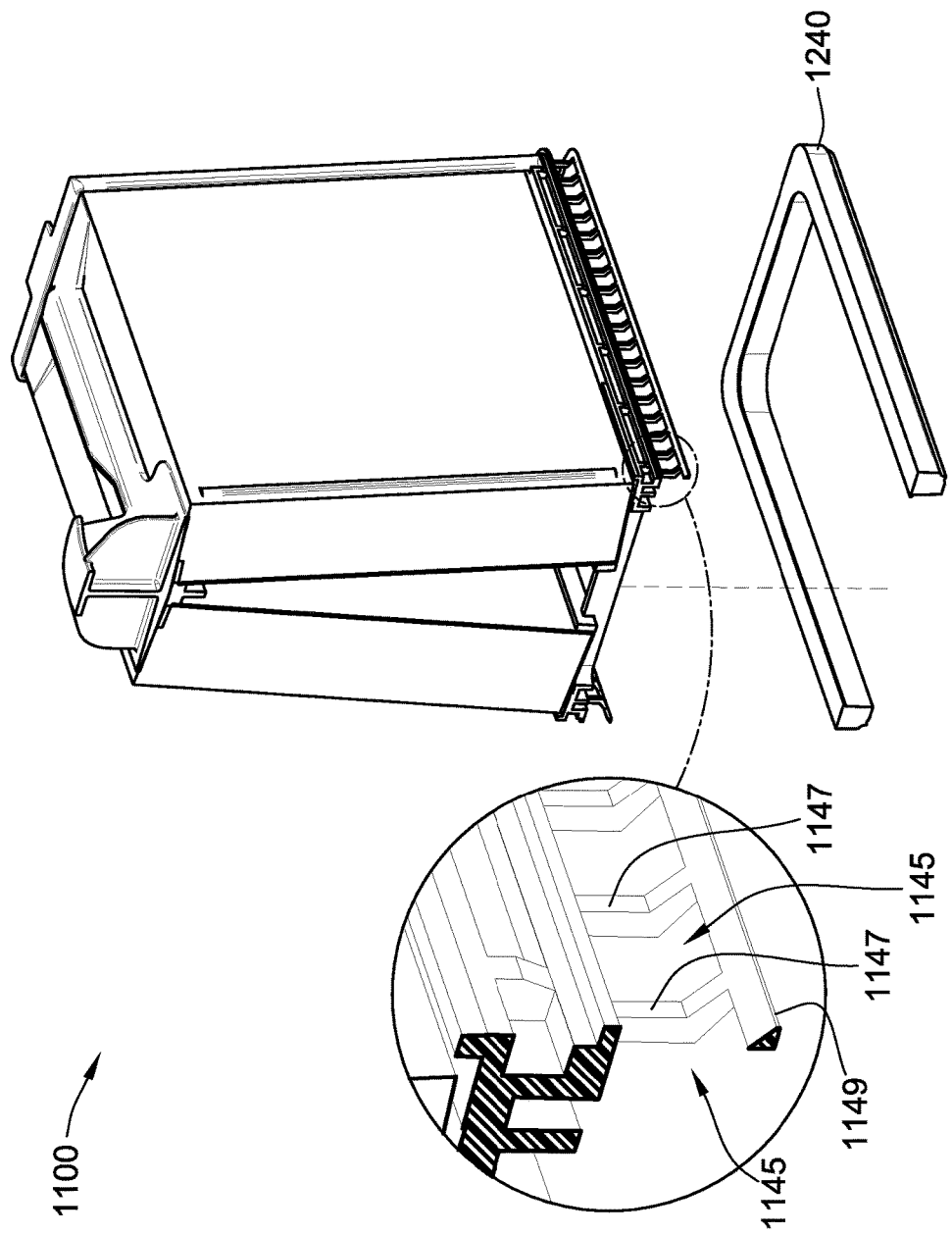
FIG. 28 is a cross-sectional, partial exploded illustration of the filter element of FIG. 26.

FIGS. 26-28 illustrate a further feature of some embodiments. While prior embodiments illustrate the use of preformed sealing gaskets (e.g. sealing gasket 840), the sealing gasket of filter element 1100 is a sealing gasket 1240 molded directly to the base frame 1144. The base frame 1144 of this embodiment includes a plurality of openings 1145 that allow material of the sealing gasket 1240 to extend therethrough for securing the sealing gasket 1240 to the base frame 1144. The portions of the sealing gasket 1240 extending through the openings 1145 seal the openings 1145 to prevent fluid bypass. The openings are formed between adjacent leg segments 1147. The leg segments 1147 are connected at distal ends by an annular bottom segment 1149.

The rest of the construction of filter element 1100 can be according to the features described above for the other filter elements.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter comprising:
    first and second filter media packs extending from a first end to a second end, the first end having a length dimension and a width dimension that extend transversely, the width dimension being defined by the first and second media packs, each of the first and second filter media packs having a first and second side, the length dimension and the first end extending between the first and second sides of the first and second filter media packs, the first and second filter media packs converging at the first end and diverging when moving away from the first end toward the second end to define an air flow cavity therebetween;
    a housing seal system at the second end;
    a handle at the first end;
    a bridge element at the first end spanning across the first and second media packs along the width dimension less than the width dimension of the first end;
    first and second shield elements extending outward from the first shield element along the width dimension in opposite directions such that the first shield element extends over the first filter media pack to a farther extent than the bridge element and the second shield element extends over the second media pack to a farther extent than the bridge element, the first and second shield elements extending a span along the length dimension of at least 5% of the length dimension defined by the first end, the first and second shield elements extending along the length dimension less than the bridge element extends along the length dimension.

2. The filter of claim 1, wherein the first and second shield elements cover the first and second filter media packs underneath the handle and in a central region along the length dimension of the first end and in a central region of the bridge element along the length dimension, the handle being spaced from the first and second shield elements with the first and second shield elements being positioned between the handle and the first and second media packs forming a recess between the handle and the first and second shield elements.

3. The filter of claim 1, wherein the first and second shield elements extend over the first and second filter media packs proximate the first side of the first and second media pack, wherein each of the first and second shield elements extend over the first and second media packs at the first end along the length dimension at least 0.5 inches.

4. The filter element of claim 3, wherein each of the first and second shield elements extend over the first and second media packs at the first end along the length dimension at least 0.75 inches.

5. The filter of claim 1, wherein the first and second shield elements and bridge element combine to project over the first and second media packs along the width dimension at least 75% of the width dimension of the first end.

6. The filter of claim 1, wherein the bridge element, and first and second shield elements combine to extend over the media pack at the first end at least 90% of the width dimension along the width dimension.

7. The filter of claim 1, wherein the handle, bridge element and first and second shield elements are at least part of a preformed component secured to the first and second media packs.

8. The filter of claim 1, wherein the first and second filter media packs are pleated having pleat folds;
    further comprising:
        first and second end caps on the first and second sides of the first and second filter media packs, wherein the pleat folds run laterally between the first and second sides;
        the bridge element extending between the first and second end caps along the length dimension of the first end.

9. The filter of claim 8, wherein the first and second shield elements are located proximate a first end of the bridge element and each of the first and second shield elements extend partially into the first end cap defining an unexposed portion and partially out of the first end cap defining an exposed portion that is exposed exteriorly of the first end cap.

10. The filter of claim 9, wherein the exposed portion extends at least 0.5 inches in the length direction and the unexposed portion extends less than 0.5 inches along the length dimension of the first end.

11. A filter comprising:
    first and second filter media packs extending from a first end to a second end, the first end having a length dimension and a width dimension that extend transversely, the first and second filter media packs converging at the first end and diverging when moving away from the first end toward the second end to define an air flow cavity therebetween, the first and second filter media packs being pleated having pleat folds;
    a housing seal system at the second end;
    first and second end caps on opposite first and second sides of the first and second filter media packs, wherein the pleat folds run laterally between the first and second opposite sides;

a handle frame at the first end including a bridge element spanning over the first and second filter media packs along the width dimension less than the width dimension of the first end and between the first and second end caps;

the handle frame includes a handle spaced away from the bridge element forming a gap between the bridge element and the handle, and the handle frame includes a first shield element projecting laterally from the bridge element along the width dimensions farther than the bridge element, the first shield element extending along the length dimension less than the bridge element.

12. The filter of claim 11, wherein the first shield element is located proximate a first end of the bridge element and extends partially into the first end cap and partially out of the first end cap defining an exposed portion that is exposed exteriorly of the first end cap.

13. The filter of claim 12, wherein the exposed portion of the first shield element covers the first and second filter media packs along the width dimension at least 75% of the width dimension and along the width dimension at least 5% of the length.

14. The filter of claim 13, further including a second shield element extending laterally from the bridge element along the width dimension farther than the bridge element and located proximate a second end of the bridge element and which extends partially into the second end cap and partially out of the second end cap defining an exposed portion that is exposed exteriorly of the second end cap.

15. The filter of claim 14, further including a third shield element extending laterally from the bridge element along the width dimension farther than the bridge element, the third shield element located centrally along the length dimension, the third shield element being spaced from both the first and second shield elements along the length dimension.

16. A housing and filter assembly, comprising:
an air cleaner housing assembly, including a housing base defining a filter cavity and a housing lid removably covering the housing base to define a filter cavity, the air cleaner assembly including a clean air outlet and an unfiltered air inlet, the housing lid comprising a tubular element projecting toward the housing base and into the cavity;

a filter disposed in the filter cavity and arranged to filter air between the clean air outlet and the unfiltered air inlet, the filter including:

a filter media arrangement having a first end and a second end;

a housing seal system at the second end;

a frame member at the first end and comprising a first shield element, the first shield element defining a perimeter larger than the tubular element to prevent the tubular element from contacting the filter media arrangement.

17. The assembly of claim 16, wherein the frame member includes an outward extending handle member spaced away from the first shield element, the handle member received within the tubular member when the housing lid is attached to the housing base.

18. A filter element comprising:
first and second filter media panels, each filter media panel defining a first, a second, a third and a fourth side, for each filter media panel, the first and second sides are offset from one another and extend between the third and fourth sides which are offset from one another;

a support frame maintaining the first and second filter media panels in a generally spaced orientation forming a cavity therebetween;

a base frame defining a first opening in fluid communication with the cavity;

a seal gasket attached to the base frame, the base frame including a plurality of openings through which the seal gasket extends, the seal gasket closing the openings; and first and second end cap structures, the first end cap structure operably sealing the third side of the first and second filter media panels and the second end cap structure operably sealing the fourth side of the first and second filter media panels, the base frame having a first portion captured in the first end cap structure and a second portion captured in the second end cap structure.

19. The filter element of claim 18, wherein the seal gasket is molded directly to the base frame and through the openings.

* * * * *

UNITED STATES PATENT AND TRADEMARK OFFICE
CERTIFICATE OF CORRECTION

PATENT NO. : 10,369,508 B2
APPLICATION NO. : 15/440161
DATED : August 6, 2019
INVENTOR(S) : William Levi Dexter et al.

It is certified that error appears in the above-identified patent and that said Letters Patent is hereby corrected as shown below:

In the Claims

In Claim 1, Column 19, Line 56, the words "first shield" should be "bridge"

In Claim 11, Column 21, Line 11, the word "dimensions" should be "dimension"

Signed and Sealed this
Twenty-ninth Day of October, 2019

Andrei Iancu
*Director of the United States Patent and Trademark Office*